US010225272B2

(12) United States Patent
Giral et al.

(10) Patent No.: US 10,225,272 B2
(45) Date of Patent: Mar. 5, 2019

(54) ORDERED CORRECTION OF APPLICATION BASED ON DEPENDENCY TOPOLOGY

(71) Applicant: CA, Inc., New York, NY (US)

(72) Inventors: Erhan Giral, Saratoga, CA (US); Mark Jacob Addleman, Oakland, CA (US); Corey Adam Cohen, Matawan, NJ (US); David Brooke Martin, San Jose, CA (US); Andreas Gerhard Reiss, Frankfurt am Main (DE); Michael Steven Walker, Los Altos, CA (US)

(73) Assignee: CA, Inc., New York, NY (US)

( * ) Notice: Subject to any disclaimer, the term of this patent is extended or adjusted under 35 U.S.C. 154(b) by 276 days.

(21) Appl. No.: 15/168,897

(22) Filed: May 31, 2016

(65) Prior Publication Data

US 2017/0346842 A1 Nov. 30, 2017

(51) Int. Cl.
| G06F 11/00 | (2006.01) |
| H04L 29/06 | (2006.01) |
| G06F 11/07 | (2006.01) |
| G06F 11/36 | (2006.01) |
| G06F 11/30 | (2006.01) |

(52) U.S. Cl.
CPC ........ *H04L 63/1425* (2013.01); *G06F 11/079* (2013.01); *G06F 11/30* (2013.01); *G06F 11/3636* (2013.01); *H04L 63/1433* (2013.01)

(58) Field of Classification Search
CPC ..... G06F 11/079; G06F 11/30; G06F 11/3636
See application file for complete search history.

(56) References Cited

U.S. PATENT DOCUMENTS

| 7,028,228 B1 * | 4/2006 | Lovy | G06F 11/3495 |
| | | | 714/47.2 |
| 7,386,839 B1 * | 6/2008 | Golender | G06F 11/3636 |
| | | | 717/127 |

(Continued)

OTHER PUBLICATIONS

Brown, et al., "An Active Approach to Characterizing Dynamic Dependencies for Problem Determination in a Distributed Application Environment", in Proceedings of the Seventh IFIP/IEEE International Symposium on Integrated Network Management, Seattle, WA, May 2001, 13 pages.

(Continued)

*Primary Examiner* — Charles Ehne
(74) *Attorney, Agent, or Firm* — Gilliam IP PLLC

(57) ABSTRACT

For each event detected during execution of a monitored application comprising a plurality of application components, a determination is made of which of the plurality of application components corresponds to the detected event. Also, a dependency subgroup that includes the application component that corresponds to the detected event is identified, wherein a dependency subgroup indicates dependencies among a subgroup of the plurality of application components. A location within the dependency subgroup of the application component corresponding to the detected event is determined. An order of correction for the application components determined to correspond to detected events are determined based, at least in part, on the determined location. Correction of the application components determined to correspond to detected events are initiated according to the determined order of correction.

20 Claims, 22 Drawing Sheets

(56) References Cited

U.S. PATENT DOCUMENTS

| | | | |
|---|---|---|---|
| 8,001,527 B1 | 8/2011 | Qureshi et al. | |
| 8,316,381 B2 | 11/2012 | Fearn et al. | |
| 2011/0202802 A1* | 8/2011 | Gotoh | G06F 11/079 |
| | | | 714/45 |
| 2011/0231704 A1* | 9/2011 | Ge | G06F 11/0709 |
| | | | 714/26 |
| 2012/0166878 A1* | 6/2012 | Sinha | G06F 11/079 |
| | | | 714/37 |
| 2014/0109112 A1* | 4/2014 | Zhang | G06F 9/542 |
| | | | 719/318 |
| 2014/0201573 A1* | 7/2014 | Huang | G06F 11/362 |
| | | | 714/38.1 |

OTHER PUBLICATIONS

Chen, et al., "Pinpoint: Problem Determination in Large, Dynamic Internet Services", in Proceedings of the International Conference on Dependable Systems and Networks (DSN'02),, 2002, 10 pages.

\* cited by examiner

ORDERED CORRECTION OF APPLICATION BASED ON DEPENDENCY TOPOLOGY

BACKGROUND

The disclosure generally relates to the field of data processing, and more particularly to an ordered correction of application(s) based on a dependency topology of the application components.

The growing presence of the Internet as well as other computer networks, such as intranets and extranets, has brought many new applications in e-commerce, education and other areas. Organizations increasingly rely on such applications to carry out their business or other objectives. Such organizations also typically devote considerable resources to ensuring that the applications perform as expected. To this end, various application monitoring techniques have been developed.

One approach involves monitoring the infrastructure of the application by collecting application runtime data regarding the individual components that are invoked in the application. This approach can use agents that essentially live in the system being monitored. For example, using instrumentation of the software, a thread or process can be traced to identify each application component that is invoked, as well as to obtain runtime data, such as the execution time of each application component. Tracing refers to obtaining a detailed record, or "trace," of the operations a computer program executes. Traces can be used as an aid in debugging or production performance monitoring.

However, as application complexity increases, diagnosis of problems continues to be difficult and time-consuming (especially when problems span multiple processes and runtimes). When a distributed transaction or application is failing or regressing, what is going wrong, why the failure is occurring, etc., needs to be determined as quickly as possible to minimize business impact.

BRIEF DESCRIPTION OF THE DRAWINGS

Embodiments of the disclosure may be better understood by referencing the accompanying drawings.

DESCRIPTION

Figure 1:
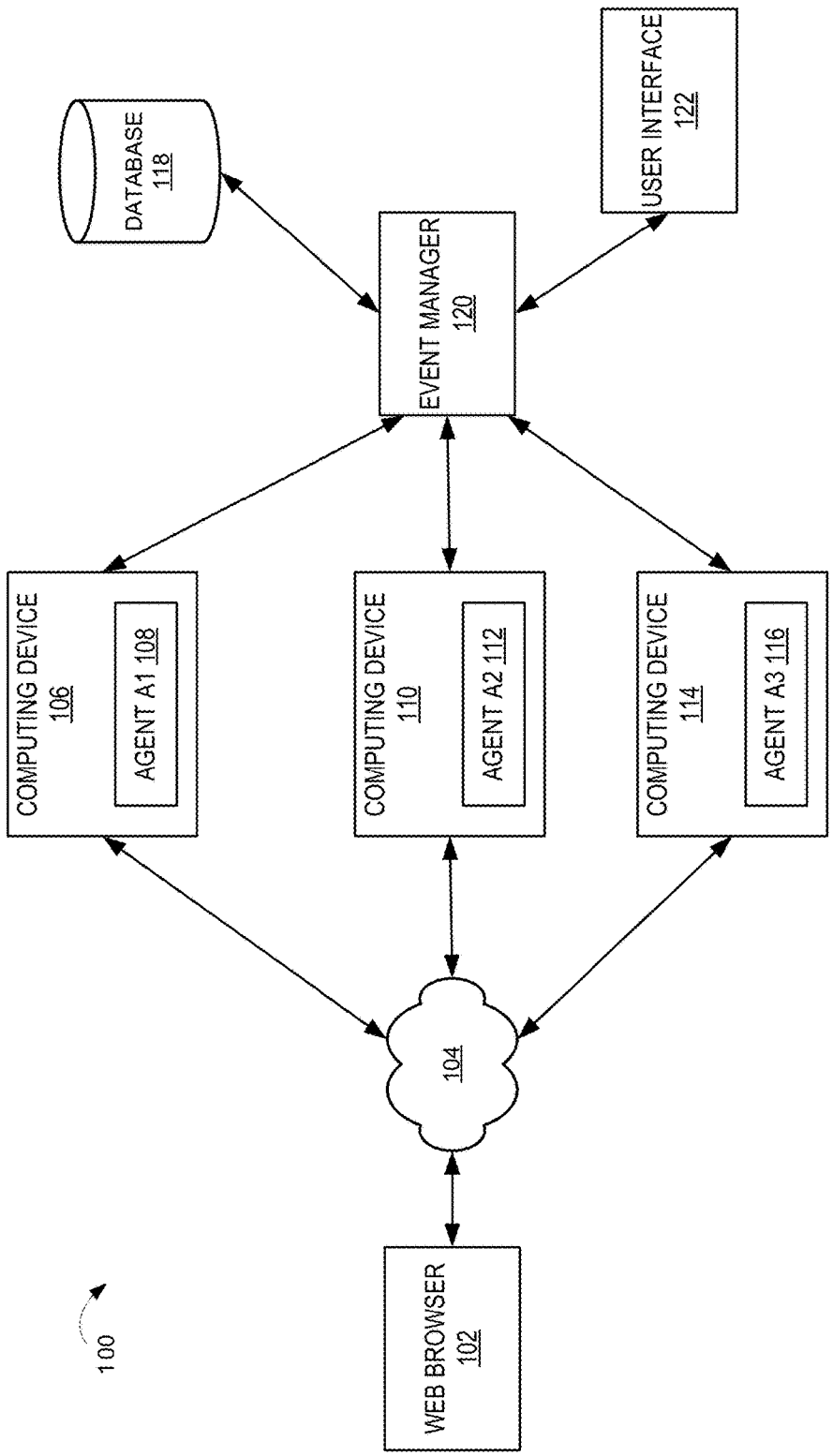
FIG. 1 depicts a system having agents for monitoring execution of an application, according to some embodiments.

The description that follows includes example systems, methods, techniques, and program flows that embody aspects of the disclosure. However, it is understood that this disclosure may be practiced without these specific details. For instance, this disclosure refers to monitoring application(s) for different business transactions. But aspects of this disclosure can be applied to many other types of applications. In other instances, well-known instruction instances, protocols, structures and techniques have not been shown in detail in order not to obfuscate the description.

Overview

Embodiments provide a prioritized ordering of assessment for correction among application components within applications. The prioritized ordering allows for selection of an application component that is the most likely root cause of event(s) (e.g., performance degradation, stalls, delayed response times, etc.) occurring during execution of an application(s). An application component can be any type of logical grouping of functionality, storage used, databases being accessed, etc. For instance, an application component can be utilized for operations to provide for a user login and authentication into a website. Or, an application component can be a queue or a database that is accessed during execution of the application(s).

Application performance can be monitored by collecting metrics and structural dependency data for applications with the help of respective agents embedded in the applications. Using the agents, some embodiments can provide a dependency topology which shows the dependency relationship among application components. The dependency topology can provide context to events that occur during execution of the application(s).

For instance, when response time of certain functionality within a complex application having a large number of application components begins slowing during execution, it may be difficult to identify the application component(s) that are a root cause of the delay. An application component can be identified as the most likely root cause of an event based on location of events in a dependency topology for at least a subgroup of the application components. There can be one or more subgroups among the number of application components in the application(s). These subgroups may or may not overlap. Each subgroup can be defined in terms of a dependency chain in the dependency topology. In other words, each dependency chain can have a subgroup of application components. Each subgroup includes those application components that have dependencies among each other.

In some situations, there can be a cascading of events such that a first event causes a second event that causes a third event, etc. This cascading makes identification of the root cause of the events even more problematic. For example, a root cause of these three different events may be the particular application component that is causing the first event and not the application components causing the second and third events. Thus, if the application component causing the first event is corrected to remove the first event, the second and third events may also be removed by this same correction. Some embodiments are able to distill the numerous detected events to locate the application component that is the most likely root cause of the events.

Embodiments provide a priority order of application components. This order can dictate the order in which application components should be assessed and potentially corrected. To illustrate, assume the priority order indicates application component X as the most likely root cause of events, application component W as the next most likely root cause of the events, application component D as the next most likely root cause of the events after application component W, etc. Accordingly, application component X can be assessed and potentially corrected first. If this does not eliminate the events, application component W can be assessed and potentially corrected. If this does not eliminate the events, application component D can be assessed and potentially corrected, etc.

The assessment and potential correction of application components can occur at any number of evaluation points in execution of an application. For example, an evaluation point can be after the application has completed execution. In another instance, an evaluation point can be after a request (e.g., a business transaction) is made and a response provided. In situations where execution of application components is stalling, an evaluation point can be after a timeout (e.g., after no response to a business transaction or other request).

Terminology

This description uses the term "application component" to refer to any logical partition of functionality, hardware used to execute portions of the application (e.g., processor), data storage used during execution of the application (e.g., queues, databases, etc.), or any other components usable within the application. For instance, an application component can be operations to provide for a user login and authentication into a website. In another instance, an application component can be operations to allow a user to access their account balance from an account balance database. An application component can also be a database from which data is accessed during execution of the application. Additionally, an application component can be some type of queues or other data structures used during execution of the application.

This description uses the term "dependency topology" to refer to an arrangement and connectivity among application components of application(s) based on dependencies of application components among each other. For example, a back end engine may access a database during execution. Therefore, the back end engine would be dependent on the database. In another example, a front end engine may receive a request for data. The front end engine can forward the request to the back end engine. In turn, the back end engine would retrieve the requested data from a database. In this example, the front end engine is dependent on the back end engine which is dependent on the database. As depicted in the figures described below, the dependency topology can be depicted via a dependency graph that illustrates the dependencies among the application components.

This description also uses the term "dependency chain" to refer to a connectivity among a group of a number of application components (e.g., a subgroup of application components within a larger group of application components). The connectivity for a dependency chain is defined: A) such that each application component in the group is dependent on at least one other application in the group or B) such that at least one other application component is dependent on the application component. For instance, an application component at the beginning of the dependency chain can be a business transaction component that transmits a request to be processed by a front end engine. The front end engine then forwards the request to a back end engine. The back end engine calls a web service and requests data from a database. The dependency chain would start with the business transaction, which is dependent on the front end engine, which is dependent on the back end engine. The back end engine would be dependent on both the web service and the database. In this example, the web service and the database would be the deepest application components in the dependency chain. The deepest application component can be the application component having the most application components that are dependent thereon. In this instance, the deepest application component can be the application at the end of the dependency chain (the web service and the database).

This description uses the term "event" to refer to any result occurring during execution of an application. An event can be defined to include any result that is not "normal" during execution of the application. What is defined as not "normal" can be predefined. For example, developers, designers, testers, etc. scan define what results are not "normal" during execution of the application. An event can include any type of degradation in performance of the application. For example, an event can be that response time of certain functionality exceeds a defined time threshold. In another example, an event can be a stall of certain functionality. An event can also include availability of an application component. For example, if a database cannot be accessed, an event can be triggered.

Example System Architecture

FIG. 1 depicts a system having agents for monitoring execution of an application, according to some embodiments. FIG. 1 depicts a system 100 in which different computing devices provide data to an event manager. The data to be provided can include events that are detected during execution of the application. Example computing devices 106, 110 and 114 may include application servers or any other type of computing device having a processor for executing code to achieve a desired functionality. The computing devices can be located remotely from one another or co-located. The computing devices 106, 110 and 114 communicate with an event manager 120 that is local in this example. The event manager 120 could alternatively be remote from the computing devices 106, 110 and 114, in which case communication may occur via a network 104.

For example, a corporation running an enterprise application, such as a web-based e-commerce application, may employ a number of application servers at one location for load balancing. Requests from users, such as from an example web browser 102 of a user, are received via the network 104 such as the Internet, and can be routed to any of the computing devices 106, 110 and 114. The web browser 102 typically accesses the network 104 via an Internet Service Provider, not shown. Agent software running on the computing devices 106, 110 and 114, denoted by Agent A1 (108), Agent A2 (112) and Agent A3 (116), respectively, gather information from an application, middleware or other software, running on the respective computing devices 106, 110 and 114, in one possible approach. Such information may be obtained using instrumentation, one example of which is byte code instrumentation. However, the gathered data may be obtained in other ways as well. The agents essentially live in the computing device being monitored and provide a data acquisition point. The agents organize the data communicated to the event manager 120. In one implementation, an instance of an Application A executes at the computing device 106 and an instance of an Application B executes at the computing device 110.

The event manager 120 can be provided on a separate computing device such as a workstation which communicates with a user interface 122, such as a monitor, to display information based on data received from the agents. The event manager 120 can also access a database 118 to store the data received from the agents. In the example provided, the computing devices can communicate with the event manager 120 without accessing the network 104. For example, the communication may occur via a local area network. In other designs, the event manager 120 can receive data from the agents of a number of computing devices via the network 104. For instance, some large organizations employ a central network operations center where one or more event managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The event manager 120 and user interface 122 might be provided at a corporate headquarters location. Other applications which are not necessarily web-based or involve retail or other sales, similarly employ agents and event managers for managing their systems. For example, a bank may use an application for processing checks and credit accounts. Moreover, in addition to the multi-computing device arrangements mentioned, a single computing device can be monitored as well with one or more agents.

Various approaches are known for configuring software to monitor its execution. For example, as mentioned at the outset, tracing may be used to track the execution of software. In one approach, object code or bytecode of an application to be monitored is configured, e.g., modified, with probes. The probes measure specific pieces of information about the application without changing the application's business logic or other logic. Once the probes have been installed in the bytecode of an application, the application is referred to as a monitored application. The agent software receives information from the probes and may communicate the information to another process, such as at the event manager 120, or process the information locally, such as to determine whether the information indicates an abnormal condition (e.g., an event). The agent thus collects and summarizes information received from the probes. The probes can collect information as defined by a directives file. For example, the information from the probes may indicate start and stop times of a transaction or other execution flow, or of individual components within a transaction/execution flow. This information can be compared to pre-established criteria to determine if the information is within bounds. If the information is not within bounds, the agent can report this fact to the event manager (triggering an event) so that appropriate troubleshooting can be performed. The agents 108, 112 and 116 are typically aware of the software executing on the local computing device 106, 110 and 114, respectively, with which they are associated.

The probes can report a standard set of metrics which include: Common Object Request Broker Architecture (CORBA) method timers, Remote Method Invocation (RMI) method timers, thread counters, network bandwidth, Java Database Connectivity (JDBC) update and query timers, servlet timers, Java Server Pages (JSP) timers, system logs, file system input and output bandwidth meters, available and used memory and EJB (Enterprise JavaBean) timers. A metric is a measurement of a specific application activity in a given time interval.

Figure 2:
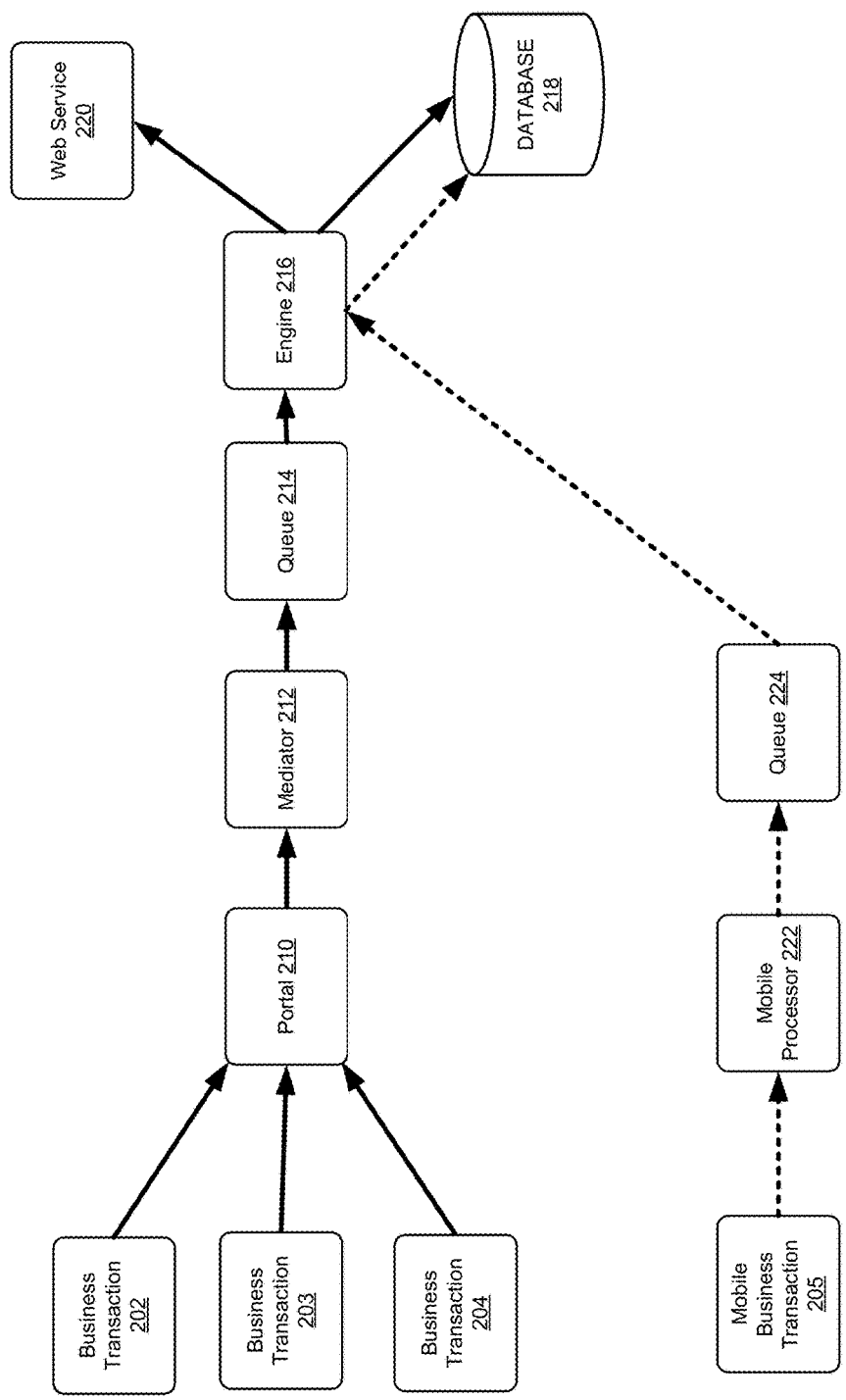
FIG. 2 depicts a first example of a dependency topology illustrating dependencies among application components of application(s), according to some embodiments.

Example of Prioritized Ordering of Application Components Based on Events in a Dependency Topology FIGS. 2-20 depict a first example of event tracking in a dependency topology. FIGS. 2-20 depict a dependency topology among a number of application components in an application(s). FIG. 2 depicts the dependency topology prior to execution of application(s). The application components include a business transaction 202, a business transaction 203, a business transaction 204, a mobile business transaction 205, a portal 210, a mediator 212, a queue 214, an engine 216, a database 218, a web service 220, a mobile processor 222 and a queue 224. In this example, there are two subgroups, wherein each one has its own dependency topology. In some embodiments, each application component (application component A) within a subgroup is dependent on at least one other application component, or at least one other application component is dependent on application component A. In some implementations, the two subgroups can overlap.

The first subgroup includes the business transactions 202-204, the portal 210, the mediator 212, the queue 214, the engine 216, the database 218, and the web service 220. The second subgroup includes the mobile business transaction 205, the mobile processor 222, the queue 224, the engine 216, the database 218, and the web service 220.

The business transactions 202-204 can be logical groupings of different accesses to a backend server. For example, the business transaction 202 can be logins of a user to a website. The business transaction 203 can be a request to purchase an item (checkout), while the business transaction 204 can be a request to retrieve more information about an item to be purchased.

The business transactions 202-204 are dependent on the portal 210, which is dependent on the mediator 212. The portal 210 is configured to receive requests from the business transactions 202-204 and forward them to the mediator 212. Thus, the business transactions 202-204 can then wait for a response from the portal 210. In turn, the portal 210 can wait for a response from the mediator 212. Additionally, some of these application components can be executing in separate devices. For instance, the business transactions 202-204 can be executing on client devices. Whereas, the portal 210 and the mediator 212 can be executing on backend servers that are communicatively coupled to the client devices. Thus, the portal 210 can provide the functionality to be the front end to receive the requests from the business transactions 202-204.

The mediator 212 can mediate among the business transactions 202-204 to determine an order that requests from the business transactions 202-204 are processed. In some implementations, the order can be a straight forward first in first processed. In other implementations, certain requests or business transactions are given higher priority and thus mediated to a higher position for processing by the mediator 212. For instance, a business transaction to provide payment for purchase of items from a registered user that is logged into their account can be of higher priority than an unregistered user that is requesting information about a product.

The mediator 212 is dependent on the queue 214. The queue 214 can represent at least two queues. A first queue to store requests and a second queue to store responses to requests that provide the results from the engine 216. After mediation to determine order of requests, the mediator 212 stores the requests in the queue 214. The engine 216 is dependent on the queue 214. The engine 216 retrieves the requests from the queue 214 for processing. The engine 216 is dependent on the database 218 and the web service 220. A first request may be for data that is stored in the database 218. For example, the first request may be a request for data related to a user's account (e.g., account balance for their savings account). A second request may be for data provided by the web service 220. For example, the second request may be for a map of a certain city provided by a mapping web service. Additionally, the requests may be for data from both the database 218 and the web service 220. The engine 216 retrieves the request from the queue 214 and processes the request to determine whether to request data from the web service 220 and/or access the data from the database 218. After receiving the data, the engine 216 can receive the data and perform any necessary processing (e.g., formatting, filtering, etc.).

The engine 216 can then return the data to the queue 214. For example, the engine 216 can store the data as a response in the separate response queue. The mediator 212 can retrieve the responses from the queue 214 and forward to the portal 210. In turn, the portal 210 can provide the responses to the business transaction that transmitted the associated request.

For the second subgroup, the mobile business transaction 205 can transmit requests similar to the business transactions 202-204. However, the mobile business transaction 205 can originate from a mobile device (instead of some non-mobile equipment (e.g., a desktop computer)).

The mobile business transaction 205 is dependent on the mobile processor 222, which is dependent on the queue 224. The mobile processor 222 can receive the request from the mobile business transaction 205 and store in the queue 224. Similar to the queue 214, the queue 224 can represent at least two queues. A first queue to store requests and a second queue to store responses to requests that provide the results from the engine 216.

The business transaction 205 can wait for a response from the mobile processor 222. In turn, the mobile processor 222 can wait for a response stored in the queue 224. The queue 224 is dependent on the engine 216. The engine 216 retrieves the requests from the queue 224 for processing. As described above, the engine 216 is dependent on the database 218 and the web service 220. The engine 216 retrieves the request from the queue 224 and processes the request to determine whether to request data from the web service 220 and/or access the data from the database 218. After receiving the data, the engine 216 can receive the data and perform any necessary processing (e.g., formatting, filtering, etc.).

The engine 216 can then return the data to the queue 224. For example, the engine 216 can store the data as a response in the separate response queue. The mobile processor 222 can retrieve the responses from the queue 224 and provide the responses to the mobile business transaction 205.

Figure 3:
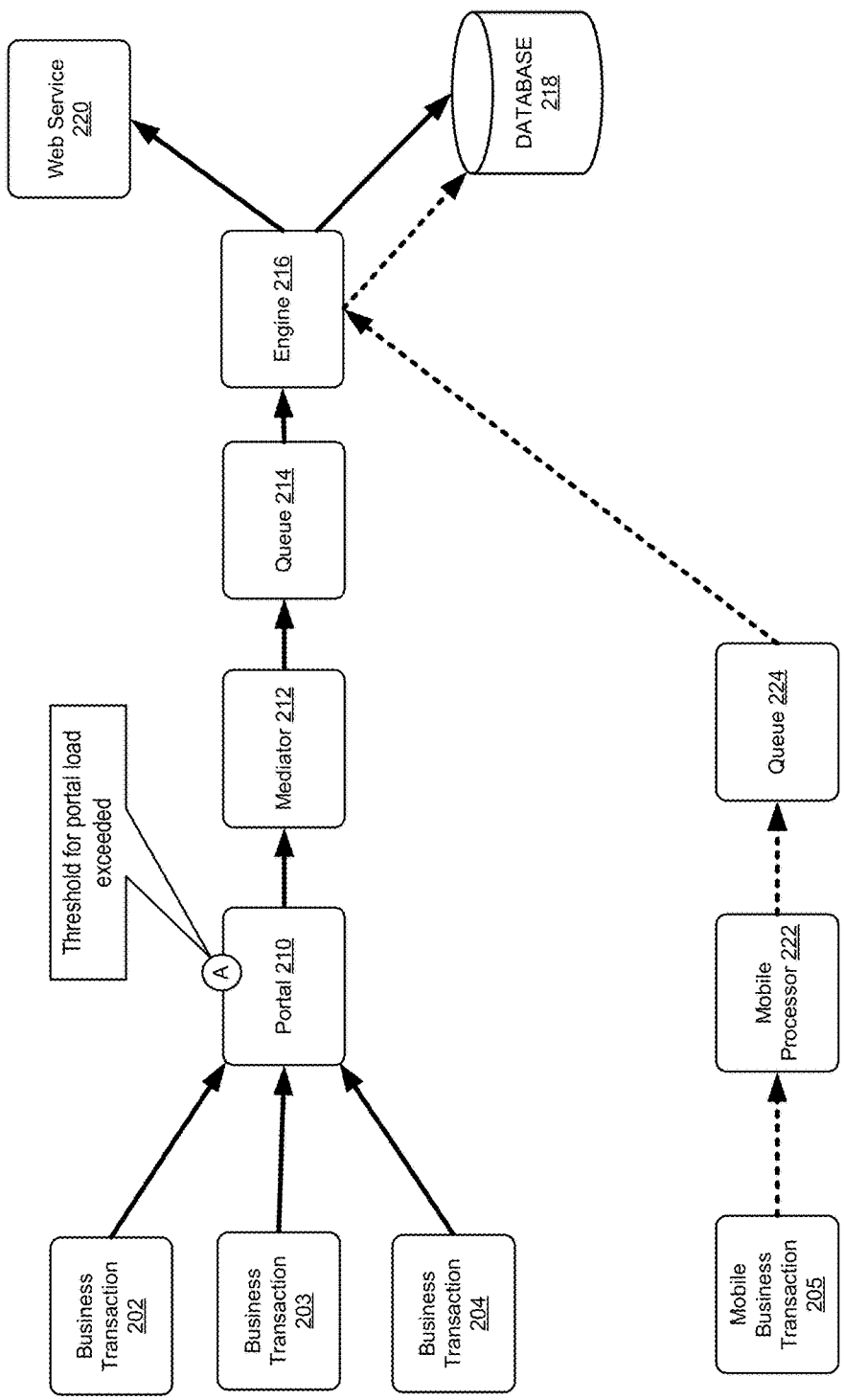
FIG. 3 depicts the dependency topology of FIG. 2 after detection of a first event, according to some embodiments.

FIG. 3 depicts the dependency topology of FIG. 2 after detection of a first event, according to some embodiments. In FIG. 3, a first event A is detected at the portal 210. The first event A is triggered in response to the load on the portal 210 exceeding a threshold. There may be too many users on the portal 210. For instance, the portal 210 typically processes requests from 50 different users. Assume that the threshold is 75 for the load on the portal 210. If the threshold of 75 is exceeded, the event is triggered and detected. With reference to the example depicted in FIG. 1, an agent executing in the portal 210 can communicate the event. The event manager 120 can detect and log the event in the database 118.

Figure 4:
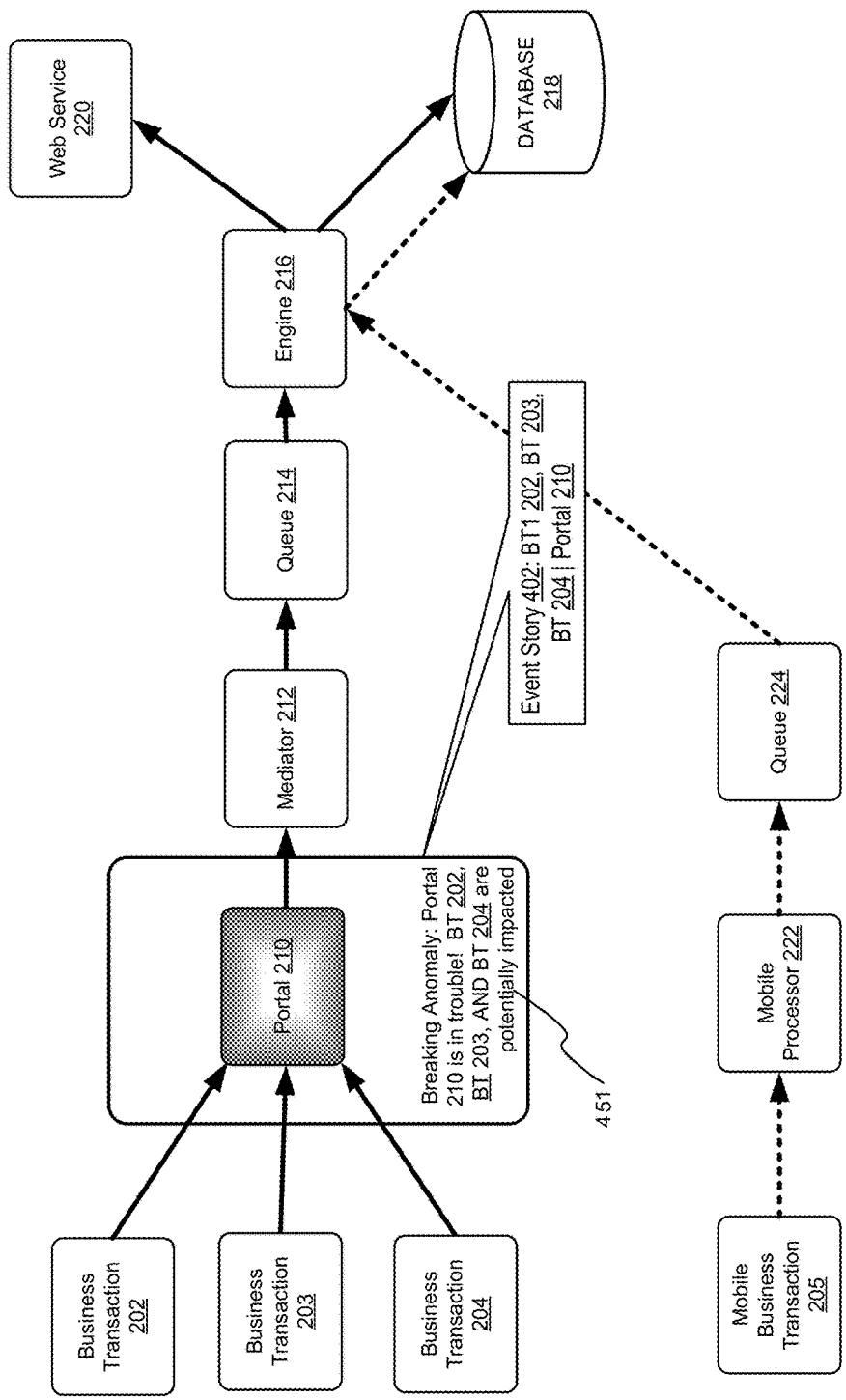
FIG. 4 depicts the dependency topology of FIG. 3 that includes the initial start of an event story in response to the first event, according to some embodiments.

FIG. 4 depicts the dependency topology of FIG. 3 that includes the initial start of an event story in response to the first event, according to some embodiments. In response to the first event A, an event story is initiated. An event story can be a data structure that logs events for application components in a subgroup having a same dependency chain. Thus, an event story can be created for each subgroup having a same dependency chain For this example, the portal 210 is in the first subgroup. An event story 402 is created for the first subgroup. The event story 402 identifies those application components affected or potentially affected by events in the same subgroup. This includes the directly affected application component where the event occurred and any application components dependent on the directly affected application component. In this example, the portal 210 is affected and the business transactions 202-204 dependent on the portal 210 are potentially affected. Thus, the event story 402 includes the business transaction (BT) 202, the business transaction (BT) 203, the business transaction (BT) 204, and the portal 210. Also, the event story can include a written description 451 that describes affects/potential affects from the first event A. In this example, the written description 451 details that there is a "Breaking Anomaly" from what is considered "normal" operations for the application(s). The breaking anomaly details:

"Portal 210 is in trouble! BT 202, BT 203, and BT 204 potentially impacted."

In addition to being recorded in the event story 402, the written description 451 can be output for display to administrators or other persons. For example, with reference to FIG. 1, the event manager 120 can output the written description 451 to be displayed on the user interface 122. Also, the application component that is most likely the root cause of the event(s) in a subgroup is highlighted. As further described below, as more events occur, the application component(s) considered the root cause changes. In FIG. 4, the portal 210 is highlighted, which indicates that the portal 210 is the most likely root cause of the first event A.

Figure 5:
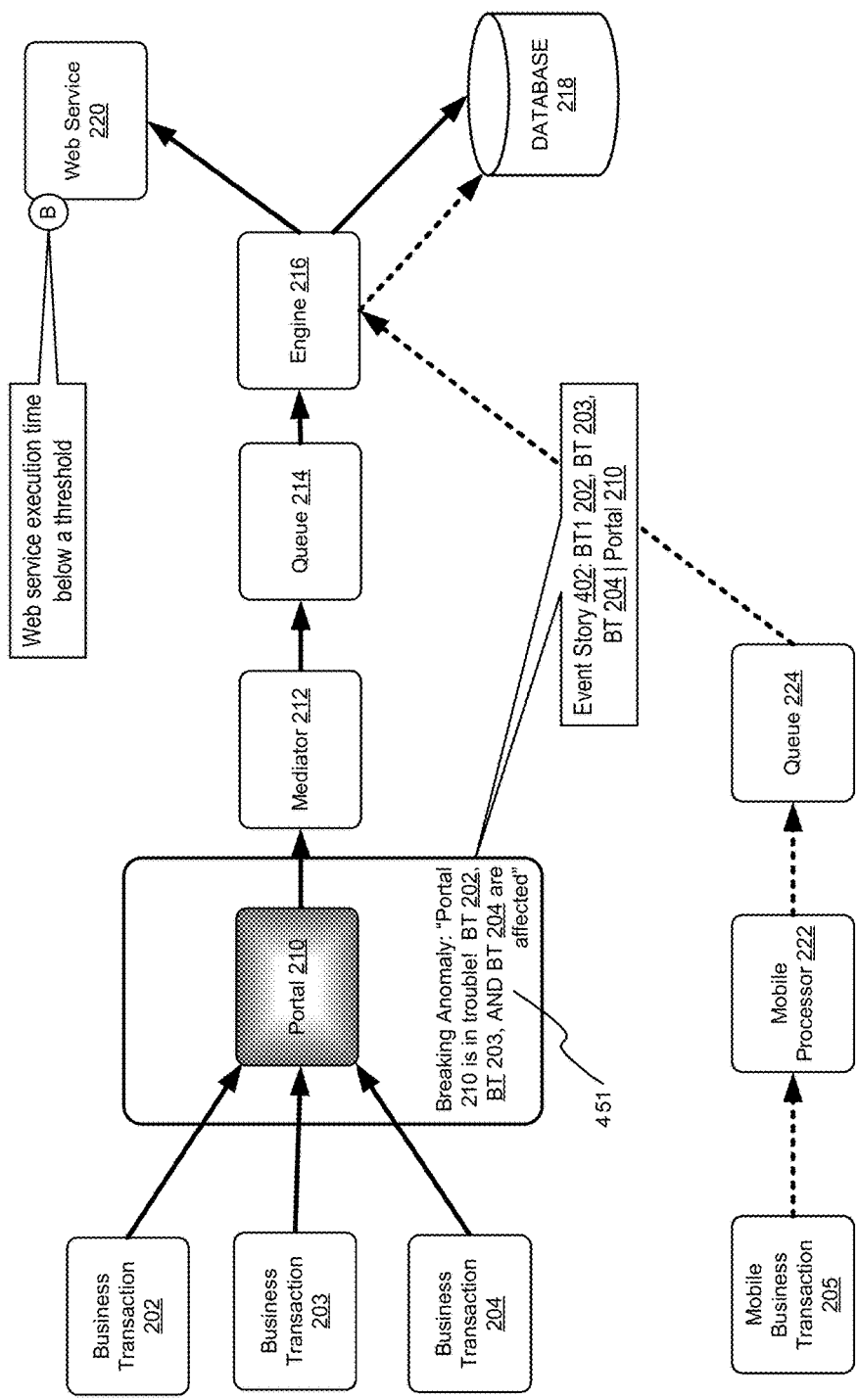
FIG. 5 depicts the dependency topology of FIG. 4 after detection of a second event, according to some embodiments.

FIG. 5 depicts the dependency topology of FIG. 4 after detection of a second event, according to some embodiments. A second event B is detected at the web service 220. The second event B is triggered in response to execution time for the web service 220 exceeding a threshold. For instance, the web service 220 typically responds within 50 milliseconds. If a threshold value of 500 milliseconds is exceeded, the event can be triggered. With reference to the example depicted in FIG. 1, an agent executing in the web service 220 and/or the engine 216 can trigger the event. The event manager 120 can detect and log the event in the database 118.

Figure 6:
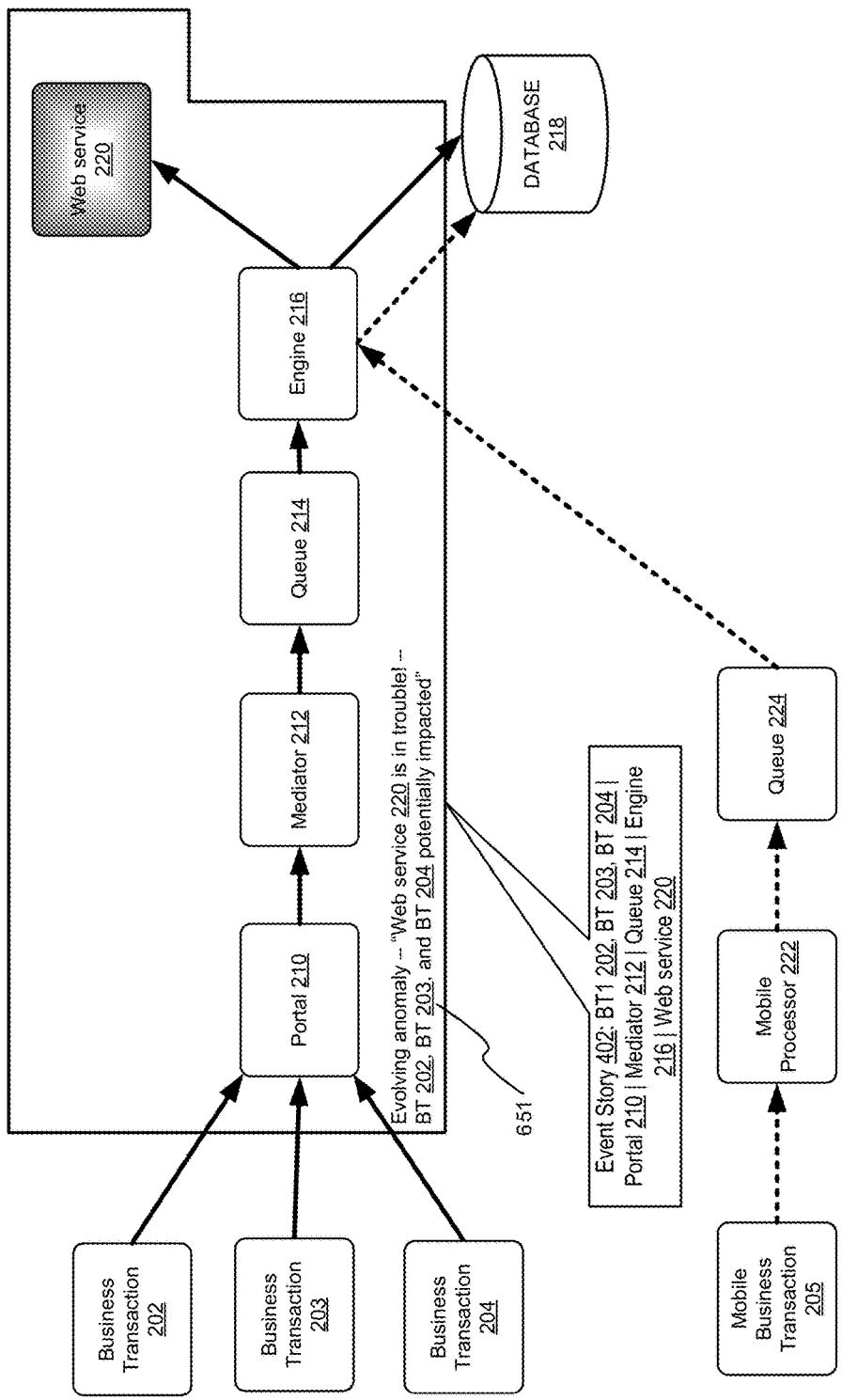
FIG. 6 depicts the dependency topology of FIG. 5 that includes the evolving event story in response to the second event, according to some embodiments.

FIG. 6 depicts the dependency topology of FIG. 5 that includes the evolving event story in response to the second event, according to some embodiments. In response to the second event B at the web service 220, the event story 402 evolves or changes. The event story 402 is updated to identify those application components affected or potentially affected by events in the same subgroup. In this example, the event story 402 is expanded (to consider both the first event A and the second event B). In this instance, the application components in the event story 402 include the business transaction (BT) 202, the business transaction (BT) 203, the business transaction (BT) 204, the portal 210, the mediator 212, the queue 214, the engine 216, and the web service 220. Specifically, the event story 402 is expanded to include the application components directly affected by the events (the portal 210 by the first event A and the web service by the second event B). The event story 402 also includes any application component in the same dependency chain that are dependent on those application components that are directly affected. In this example, the engine 216, the queue 214, the mediator 212, the portal 210, and the business transactions 202-204 are dependent on the web service 220.

A written description 651 is added to the event story 402. The written description 651 describes affects/potential affects from the second event B. In this example, the written description 651 details that the breaking anomaly is now an "Evolving Anomaly". The evolving anomaly details the specific application component directly affected and any business transactions that are potentially affected (thereby affecting end users that are creating the business transactions):

"Web service 220 is in trouble! BT 202, BT 203, and BT 204 potentially impacted."

In addition to being recorded in the event story 402, the written description 651 can be output for display to administrators or other persons. For example, with reference to FIG. 1, the event manager 120 can output the written description 651 to be displayed on the user interface 122.

Also, the application component that is most likely the root cause of the event(s) in a subgroup is highlighted. This decision of the most likely root cause can be based on a priority order for the application components where events occurred. In this example, there are two application components where events have occurred that need to be ordered—the portal 210 and the web service 220. The first application component in the priority order is the most likely root cause of the event(s), the second application component is the next most likely root cause, the third application component is the next most likely root cause, etc. In some embodiments, the priority order is based on the location of the application components in the dependency chain. For example, the first application component where an event occurred that is the deepest in the dependency chain is the most likely root cause of the events, the second application component where an event occurred that is the next deepest in the dependency chain is the next most likely root cause of the events, etc. In some embodiments, the deepest application component is the application component having the most application components that are dependent thereon. In this instance, the web service 220 is deeper than the portal 210. Specifically, the web service 220 has seven other application component dependent thereon—the engine 216, the queue 214, the mediator 212, the portal 210, the business transaction 202, the business transaction 203, and the business transaction 204. Whereas, the portal 210 has three other application components dependent thereon—the business transaction 202, the business transaction 203, and the business transaction 204. Therefore, the priority order is the web service 220 followed by the portal 210. The web service 220 is the most likely root cause, and the portal 210 is the next most likely root cause. Thus, the web service 220 is highlighted to indicate that the web service 220 is the most likely root cause of the events in the dependency chain.

Figure 7:
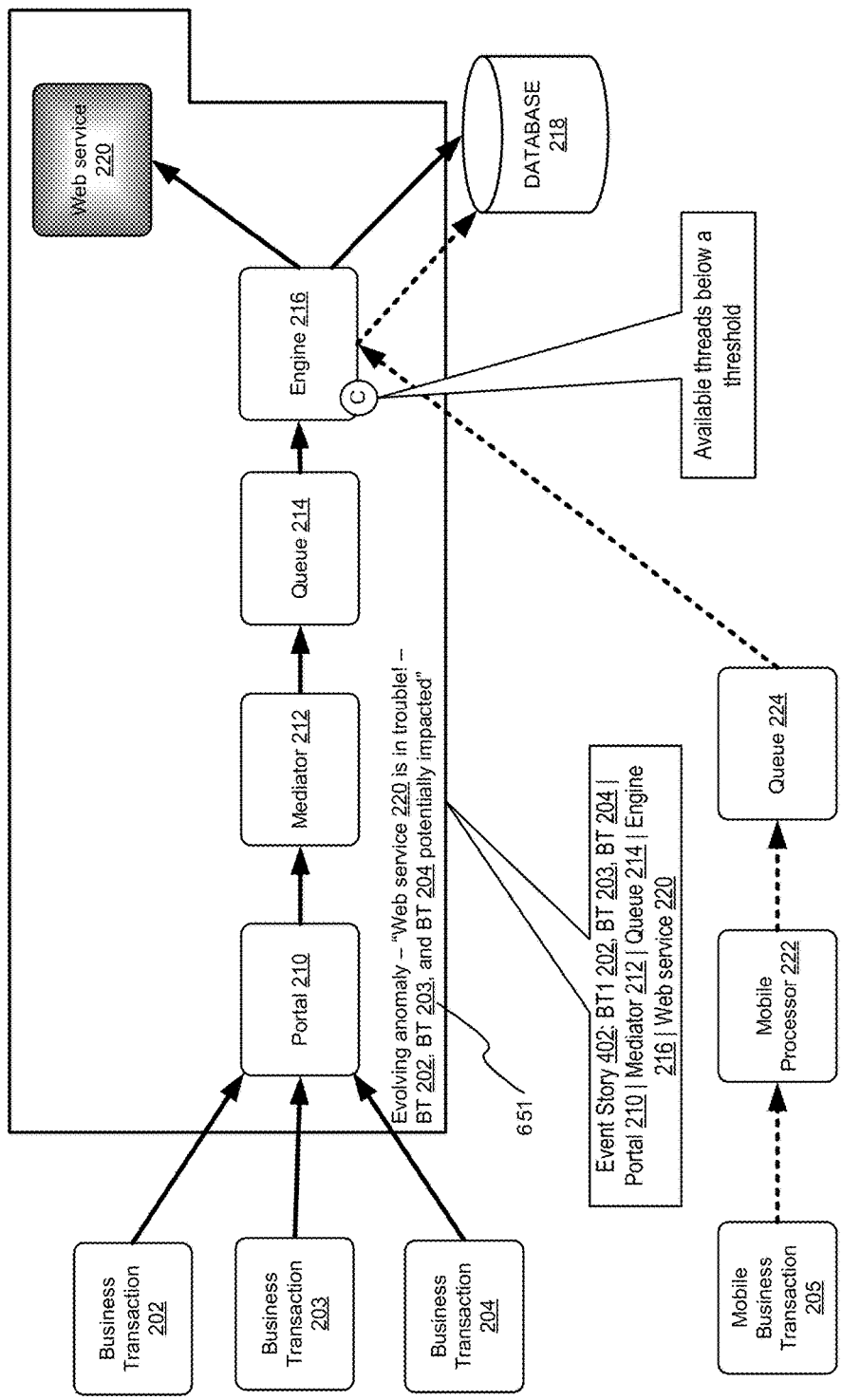
FIG. 7 depicts the dependency topology of FIG. 6 after detection of a third event, according to some embodiments.

FIG. 7 depicts the dependency topology of FIG. 6 after detection of a third event, according to some embodiments. A third event C is detected at the engine 216. The third event C is triggered in response to the number of available threads at the engine 216 falling below a threshold. For instance, the threshold is set so that the number of available threads should remain at three or more. If the number of available threads at the engine 216 falls below three, the event is triggered. With reference to the example depicted in FIG. 1, an agent executing in the engine 216 can trigger the event. The event manager 120 can detect and log the event in the database 118.

Figure 8:
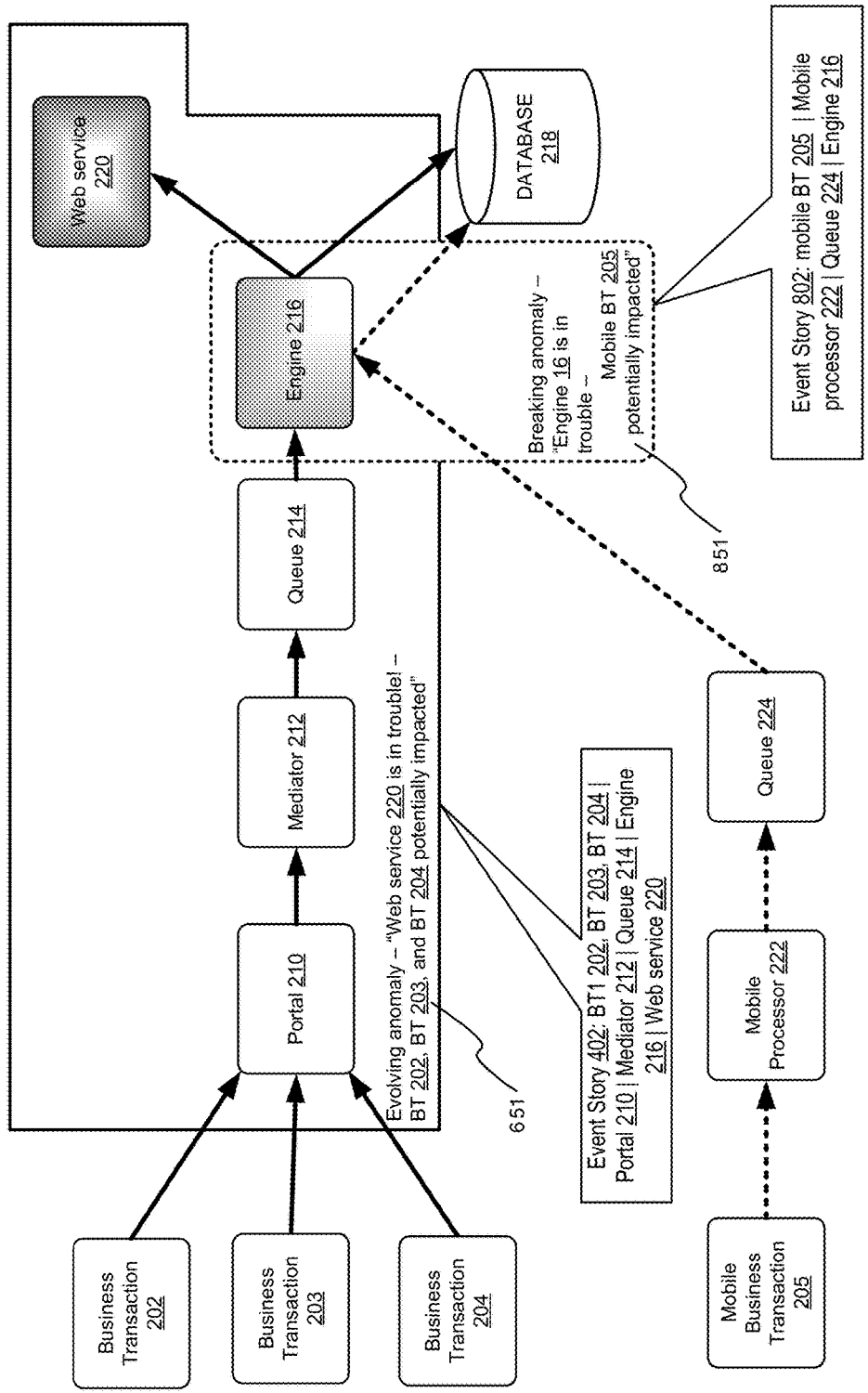
FIG. 8 depicts the dependency topology of FIG. 7 that includes the evolving event story in response to the third event, according to some embodiments.

FIG. 8 depicts the dependency topology of FIG. 7 that includes the evolving event story in response to the third event, according to some embodiments. In response to the third event C at the engine 216, the event story 402 remains unchanged. In this example, the application components affected or potentially affected in this subgroup remain the same—the business transaction (BT) 202, the business transaction (BT) 203, the business transaction (BT) 204, the portal 210, the mediator 212, the queue 214, the engine 216, and the web service 220. The engine 216 is already considered potentially affected by the events occurring. Thus far, events have occurred at the portal 210, the web service 220, and the engine 216. Among these three, the web service 220 is still the deepest in the dependency chain for this subgroup. Thus, the web service 220 remains highlighted to indicate that the web service 220 is the most likely root cause of the events in the dependency chain. No additional written description is added to the event story 402 for this event because no additional application components are added to the event story 402.

In response to the third event C, a second event story is created—an event story 802 for the second subgroup. The event story 802 is created because application components in the second subgroup are now affected or potentially affected by the third event C. The event story 802 identifies those application components affected or potentially affected by events in the same subgroup. This includes the directly affected application component where the event occurred and any application components dependent on the directly affected application component.

In this example, the engine 216 is directly affected and the mobile business transaction 205, the mobile processor 222, and the queue 224 are potentially affected. Also, the event story 802 can include a written description 851 that describes affects/potential affects from the events detected thus far. In this example, the written description 851 details that there is a "Breaking Anomaly" from what is considered "normal" operations for the application(s). The breaking anomaly details:

"Engine 216 is in trouble! Mobile BT 205 potentially impacted."

In addition to being recorded in the event story 802, the written description 851 can be output for display to administrators or other persons (similar to the written descriptions for the event story 402—described above). For example, with reference to FIG. 1, the event manager 120 can output the written description 851 to be displayed on the user interface 122. Also, the application component that is most likely the root cause of the event(s) in a subgroup is highlighted. In FIG. 8, the engine 216 is highlighted, which indicates that the engine 216 is the most likely root cause of the events detected thus far for the second subgroup. As shown, each subgroup having application components that are affected or potentially affected has its own "most likely root cause of events detected." In this example, the web service 220 is the most likely root cause for the first subgroup, and the engine 216 is the most likely root cause for the second subgroup.

Figure 9:
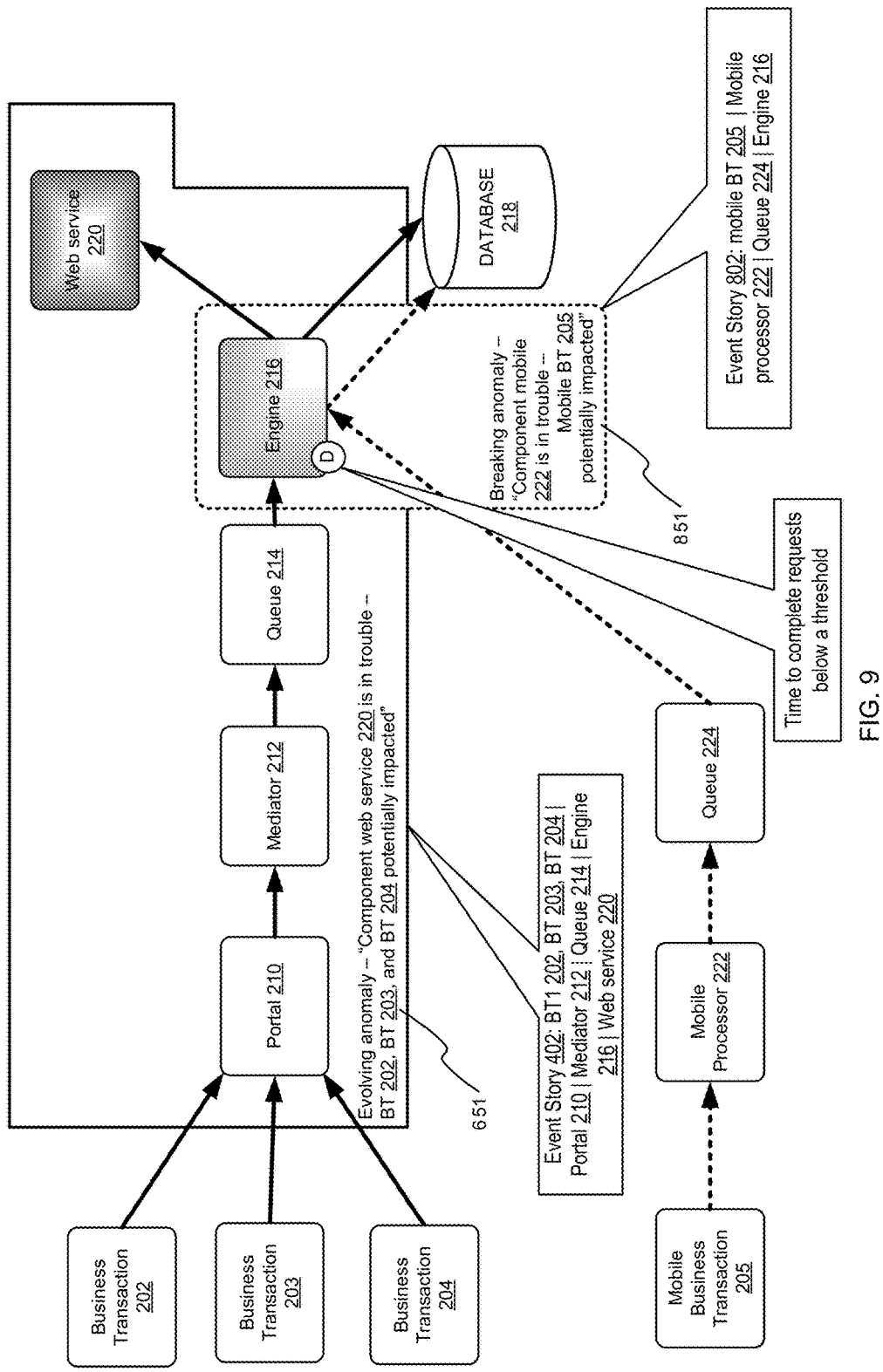
FIG. 9 depicts the dependency topology of FIG. 8 after detection of a fourth event, according to some embodiments.

FIG. 9 depicts the dependency topology of FIG. 8 after detection of a fourth event, according to some embodiments. A fourth event D is detected at the engine 216. The fourth event D is triggered in response to the time to complete requests falling below a threshold. This time can be an average value for requests processed, one value for one request processed, values for requests from a particular business transaction, etc. With reference to the example depicted in FIG. 1, an agent executing in the engine 216 can trigger the event. The event manager 120 can detect and log the event in the database 118.

Figure 10:
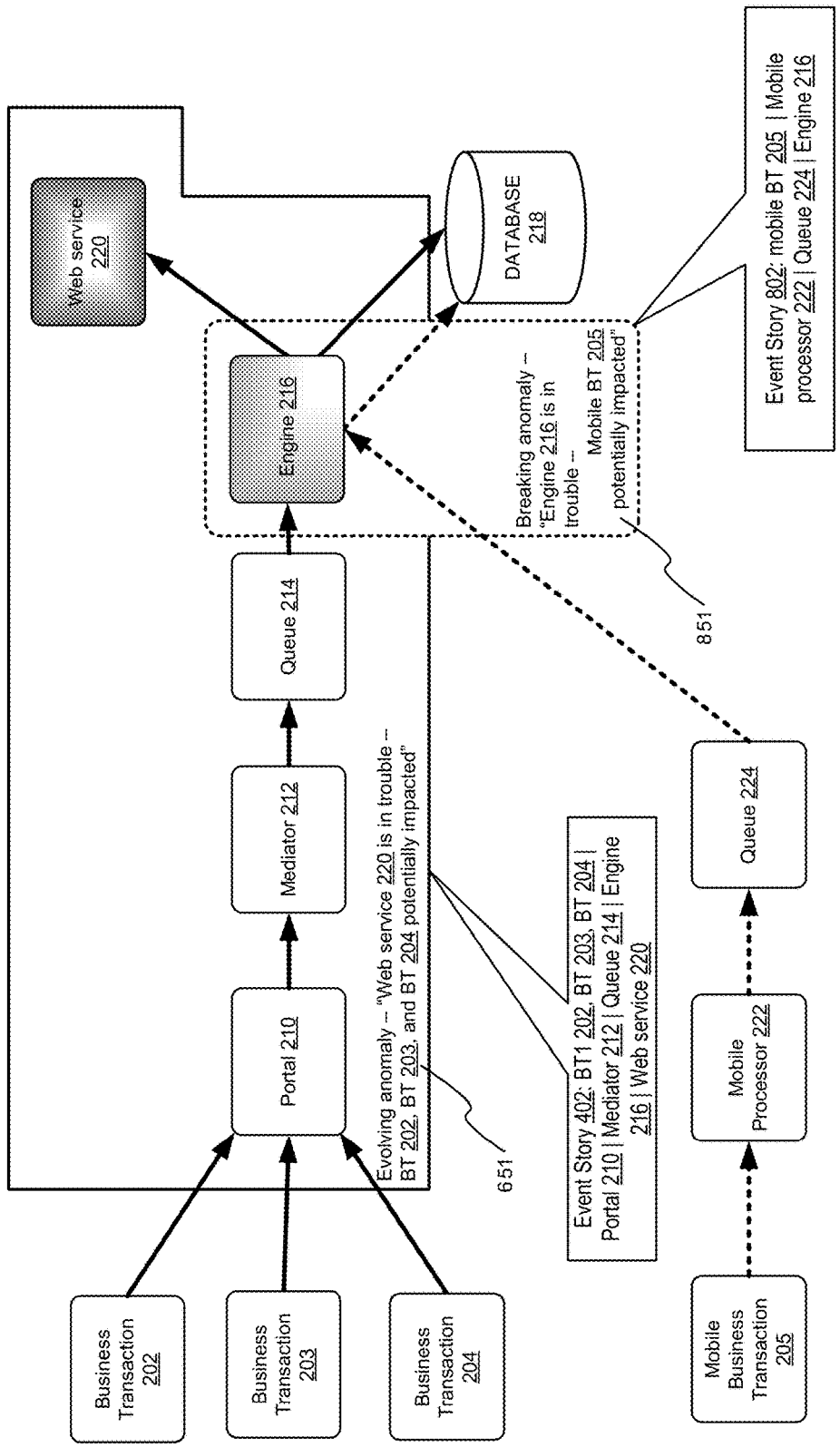
FIG. 10 depicts the dependency topology of FIG. 9 that includes the evolving event story in response to the fourth event, according to some embodiments.

FIG. 10 depicts the dependency topology of FIG. 9 that includes the evolving event story in response to the fourth event, according to some embodiments. In response to the fourth event D at the engine 216, neither the event story 402 nor the event story 802 evolves. In this instance, no additional components are affected or potentially affected. Also, the application components that are the most likely root cause of the events for each subgroup remains unchanged. In this case, the web service 220 is still the deepest application component in the dependency chain directly affected by the events for the event story 402. Similarly, the engine 216 is still the deepest application component in the dependency chain directly affected by the events for the event story 802. No new written description is added for either story in response to the fourth event D.

Figure 11:
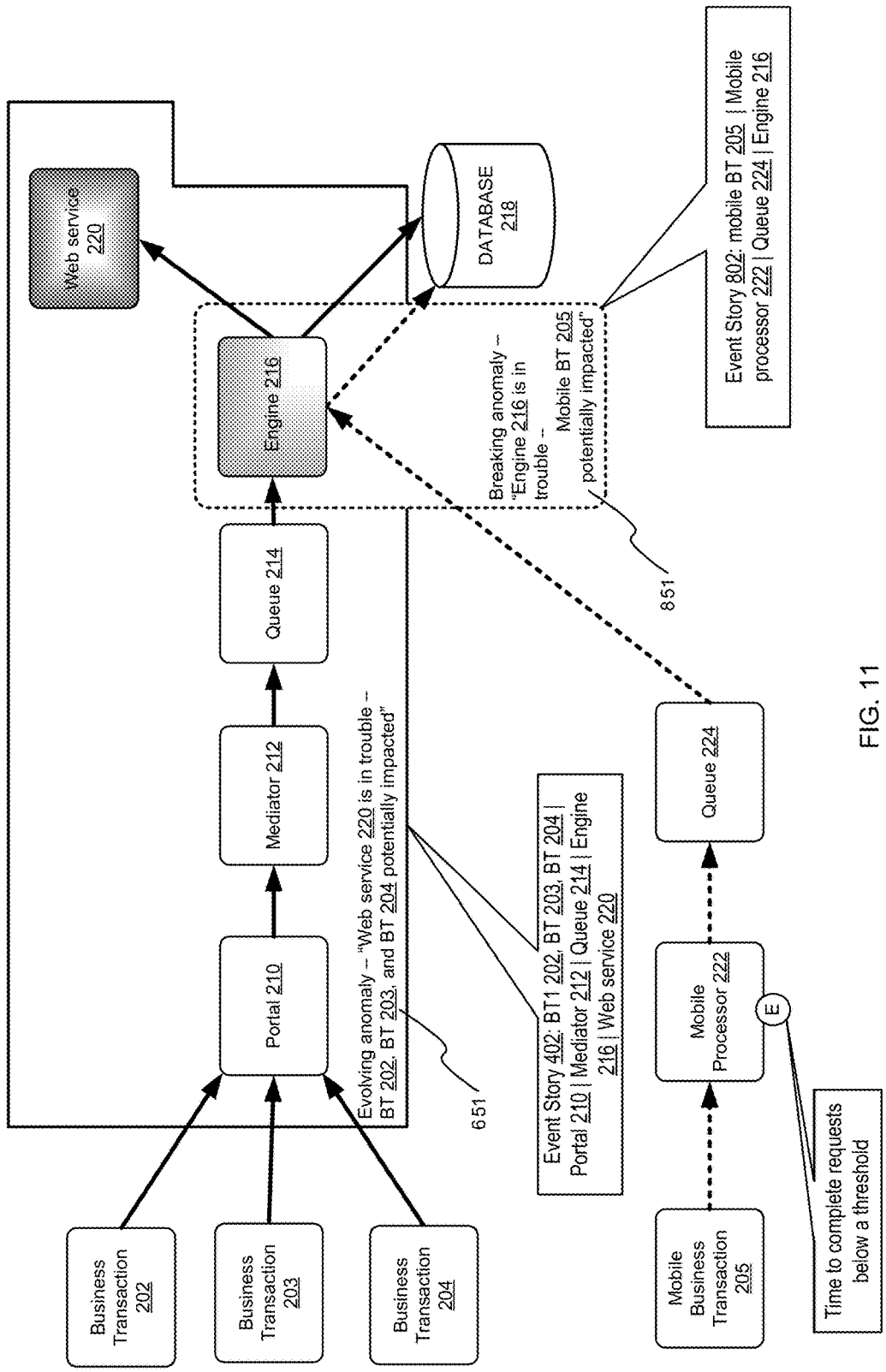
FIG. 11 depicts the dependency topology of FIG. 10 after detection of a fifth event, according to some embodiments.

FIG. 11 depicts the dependency topology of FIG. 10 after detection of a fifth event, according to some embodiments. A fifth event E is detected at the mobile processor 222. The fifth event E is triggered in response to the time to complete requests falling below a threshold. Similar to the fourth event D, this time can be an average value for requests processed, one value for one request processed, values for requests from a particular business transaction, etc. With reference to the example depicted in FIG. 1, an agent executing in the mobile processor 222 can trigger the event. The event manager 120 can detect and log the event in the database 118.

Figure 12:
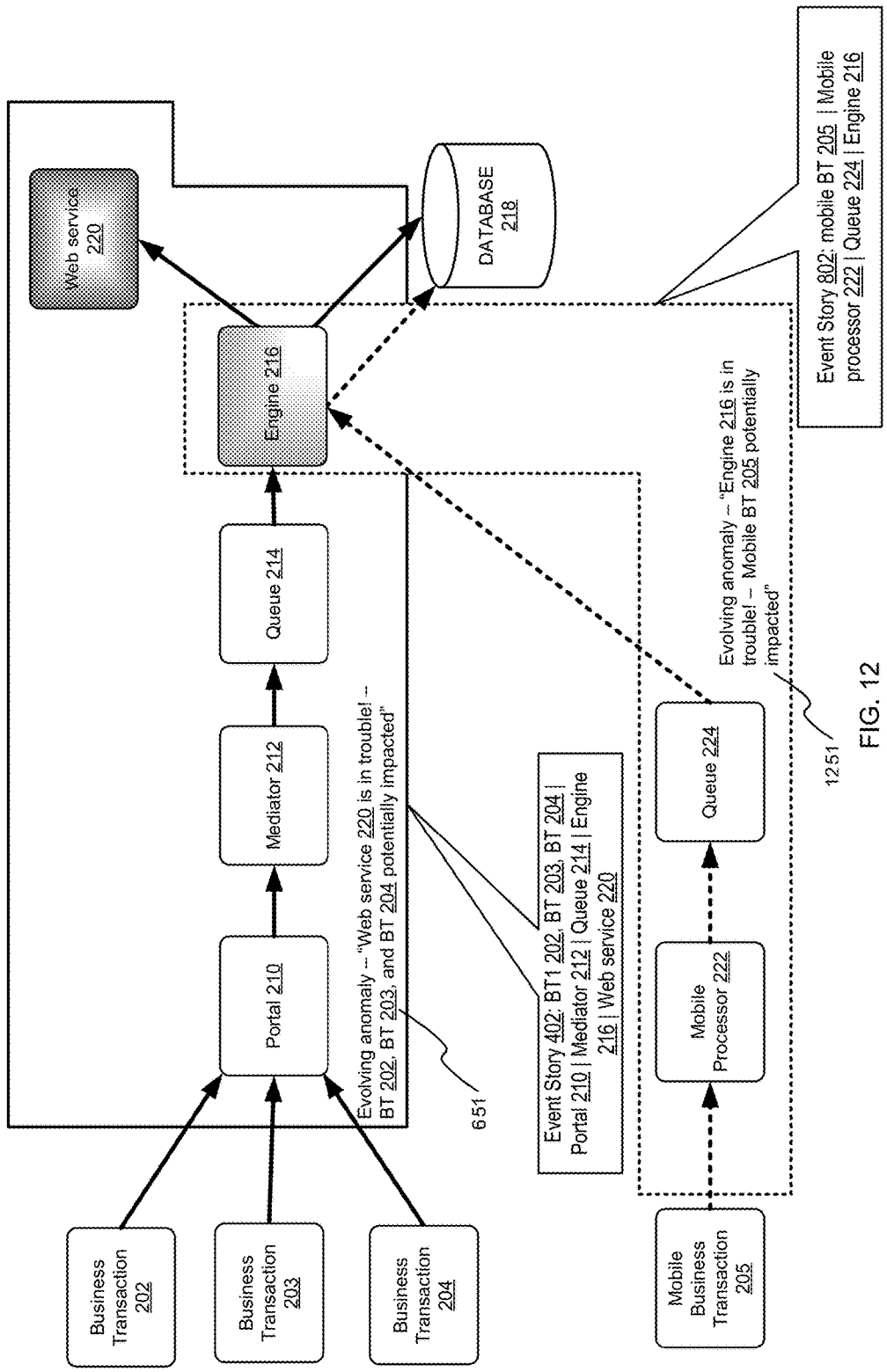
FIG. 12 depicts the dependency topology of FIG. 11 that includes the evolving event story in response to the fifth event, according to some embodiments.

FIG. 12 depicts the dependency topology of FIG. 11 that includes the evolving event story in response to the fifth event, according to some embodiments. In response to the fifth event E at the mobile processor 222, the event story 402 remains unchanged. Specifically, the mobile processor 222 is not in the first subgroup. Thus, this event at the mobile processor 222 has no effect on application components in the first subgroup.

However, the application components in the second subgroup are affected by the fifth event E. The event story 802 is updated to identify those application components affected or potentially affected by events in the same subgroup. In this example, the event story 802 is expanded. The application components affected or potentially affected in the event story 802 include the mobile business transaction (BT) 205, the mobile processor 222, the queue 224, and the engine 216.

A written description 1251 is added to the event story 802. The written description 1251 describes effects and potential effects from the fifth event E. In this example, the written description 1251 details that the breaking anomaly is now an "Evolving Anomaly". The evolving anomaly details the specific application component directly affected and any business transactions that are potentially affected (thereby affecting end users that are creating the business transactions):

"Engine 216 is in trouble! Mobile BT 205 potentially impacted."

In addition to being recorded in the event story 802, the written description 1251 can be output for display to administrators or other persons (as described above for other written descriptions). For the event story 802 events occurred at two application components—the mobile processor 222 and the engine 216. As described above, if there are multiple application components where an event occurred, the application component that is deepest in the dependency chain is selected as the most likely root cause of the events within the dependency chain. In this instance, the engine 216 is selected as the most likely root cause of the events within the dependency chain for this second subgroup because the engine 216 is deeper than the mobile processor 222. In this example, because events occurred at both the portal 210 and the web service 220, the web service 220 is selected as the most likely root cause of the events within the dependency chain because the web service 220 is deeper than the portal 210 in the dependency chain for this subgroup. Thus, the engine 216 remains highlighted to indicate that the engine 216 is the most likely root cause of the events in the dependency chain.

Figure 13:
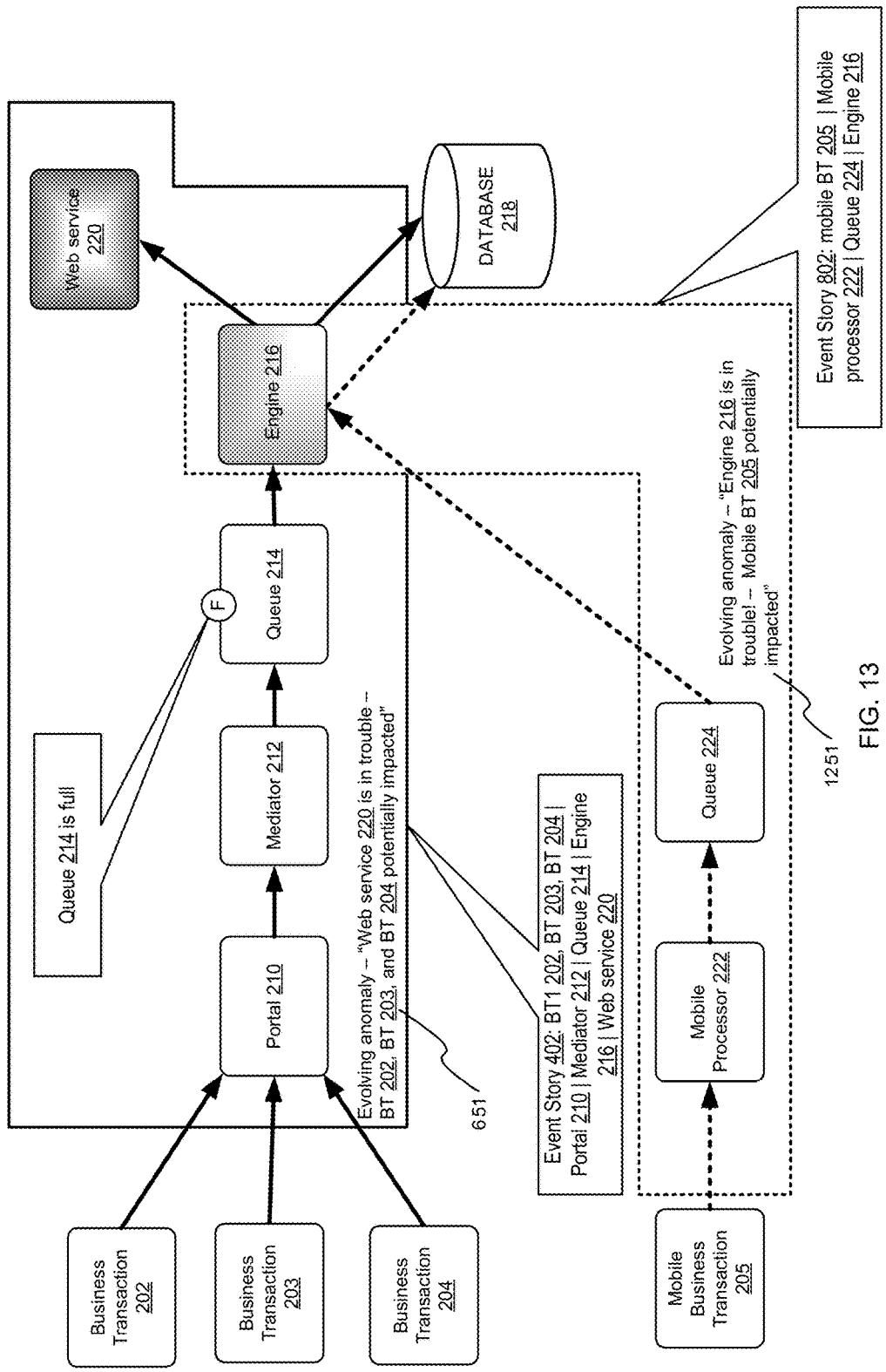
FIG. 13 depicts the dependency topology of FIG. 12 after detection of a sixth event, according to some embodiments.

FIG. 13 depicts the dependency topology of FIG. 12 after detection of a sixth event, according to some embodiments. A sixth event F is detected in the queue 214. The fifth event E is triggered in response to the queue 214 being full. With reference to the example depicted in FIG. 1, an agent executing in the queue 214 can trigger the event. The event manager 120 can detect and log the event in the database 118.

Figure 14:
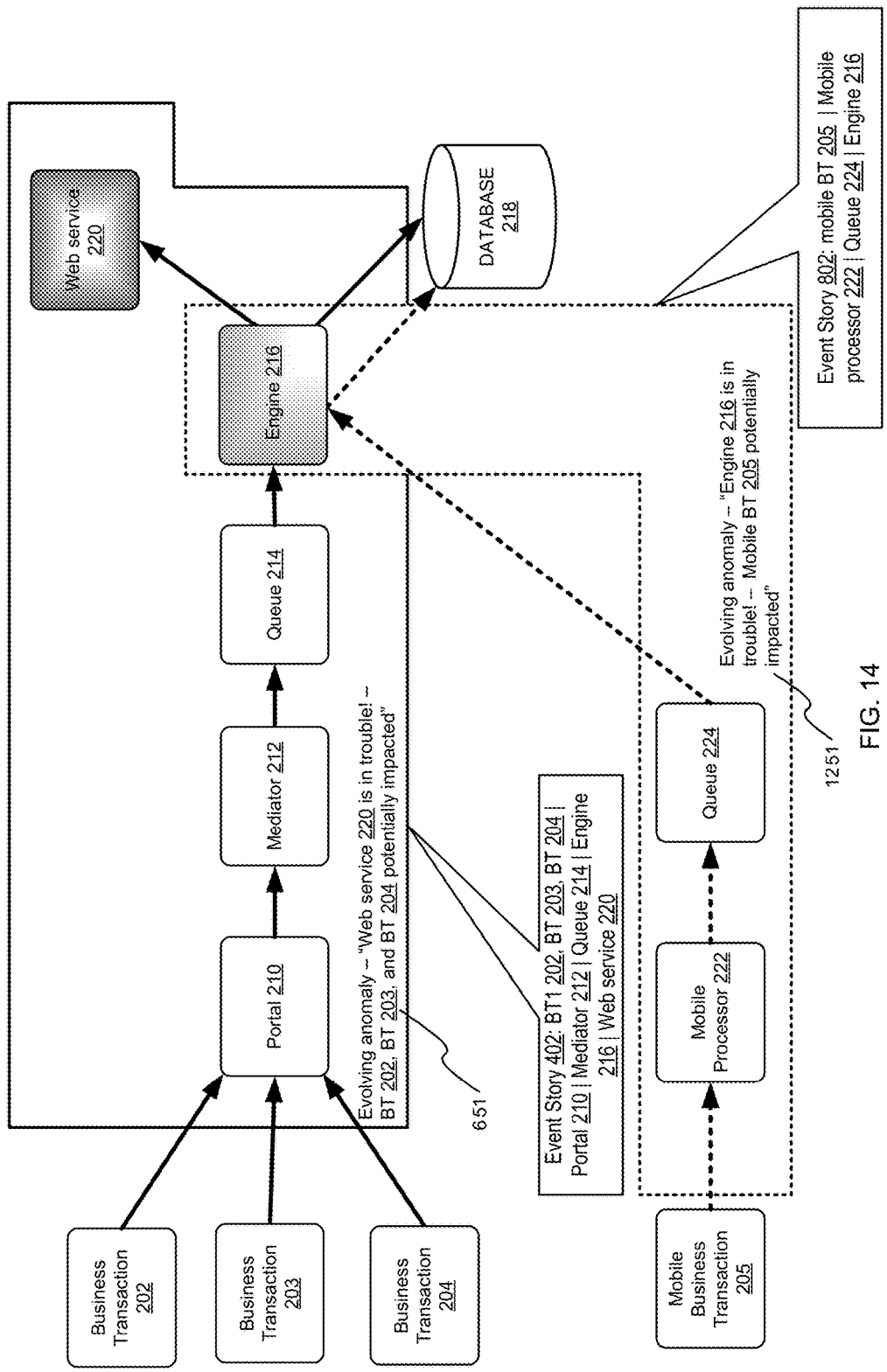
FIG. 14 depicts the dependency topology of FIG. 13 that includes the evolving event story in response to the sixth event, according to some embodiments.

FIG. 14 depicts the dependency topology of FIG. 13 that includes the evolving event story in response to the sixth event, according to some embodiments. In response to the sixth event F at the queue 214, both the event story 402 and the event story 802 remain unchanged. For the event story 402, no additional components are affected or potentially affected. Also, the application components that are the most likely root cause of the events for each subgroup remains unchanged. In this case, the web service 220 is still the deepest application component in the dependency chain directly affected by the events for the event story 402. For the event story 802, the queue 214 is not in the second subgroup. Thus, this event at the queue 214 has no effect on application components in the second subgroup. No new written description is added for either story in response to the sixth event E.

Figure 15:
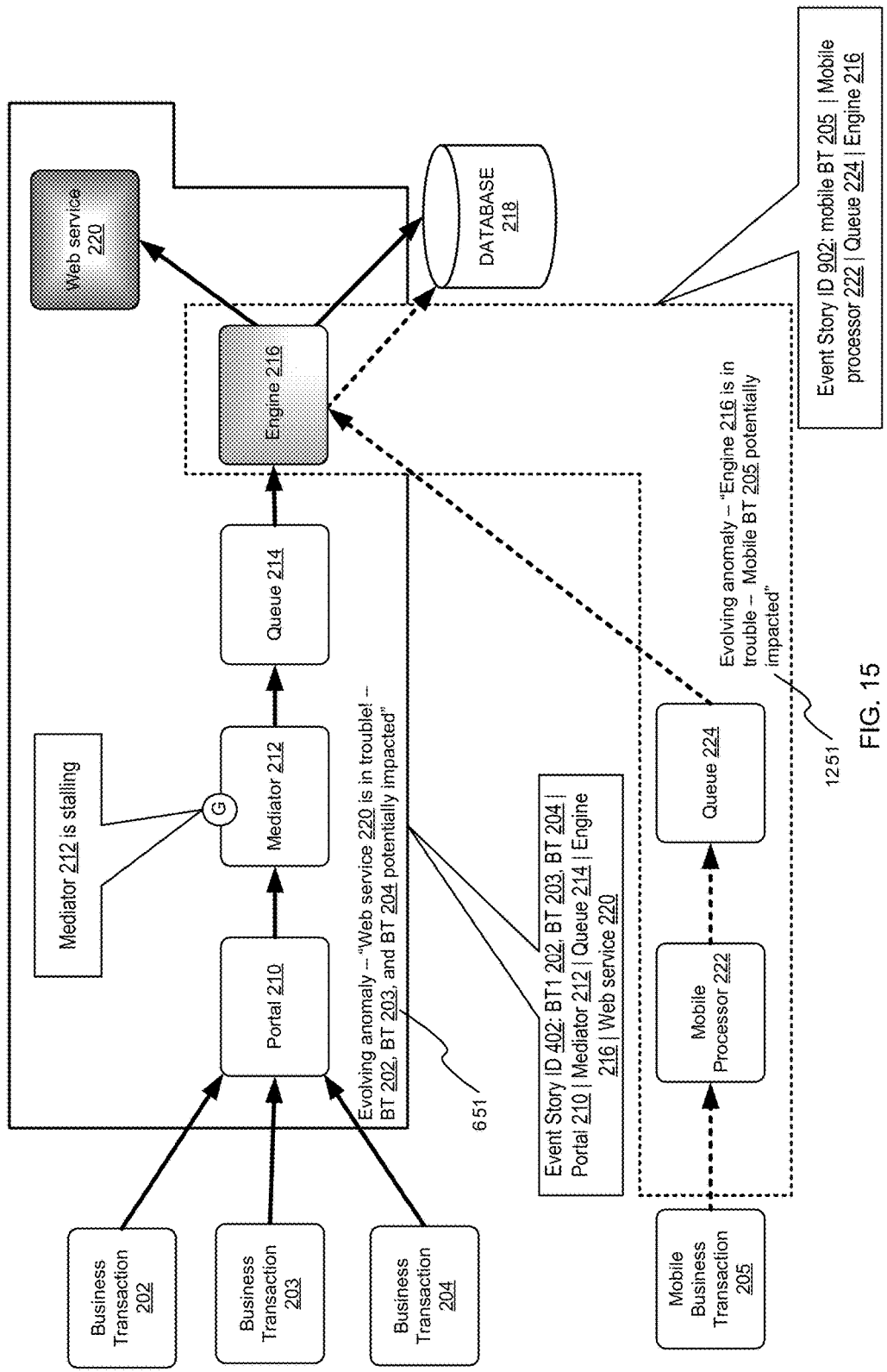
FIG. 15 depicts the dependency topology of FIG. 14 after detection of a seventh event, according to some embodiments.

FIG. 15 depicts the dependency topology of FIG. 14 after detection of a seventh event, according to some embodiments. A seventh event G is detected in the mediator 212. The seventh event G is triggered in response to the mediator 212 stalling. With reference to the example depicted in FIG. 1, an agent executing in the mediator 212 can trigger the event. The event manager 120 can detect and log the event in the database 118.

Figure 16:
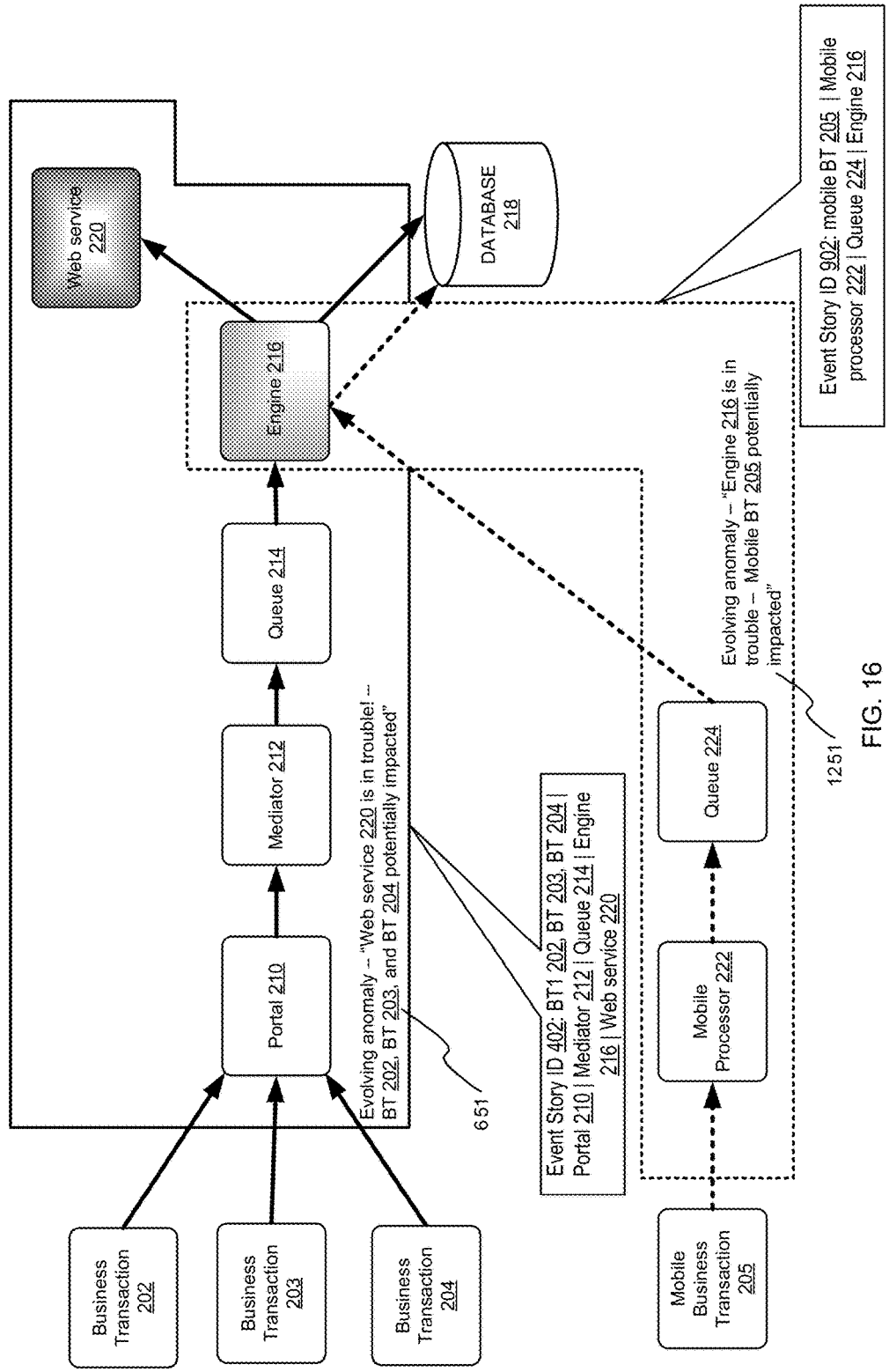
FIG. 16 depicts the dependency topology of FIG. 15 that includes the evolving event story in response to the seventh event, according to some embodiments.

FIG. 16 depicts the dependency topology of FIG. 15 that includes the evolving event story in response to the seventh event, according to some embodiments. In response to the seventh event G at the mediator 212, both the event story 402 and the event story 802 again remain unchanged. For the event story 402, no additional components are affected or potentially affected. Also, the application components that are the most likely root cause of the events for each subgroup remains unchanged. In this case, the web service 220 is still the deepest application component in the dependency chain directly affected by the events for the event story 402. For the event story 802, the mediator 212 is not in the second subgroup. Thus, this event at the mediator 212 has no effect on application components in the second subgroup. No new written description is added for either story in response to the seventh event G.

Figure 17:
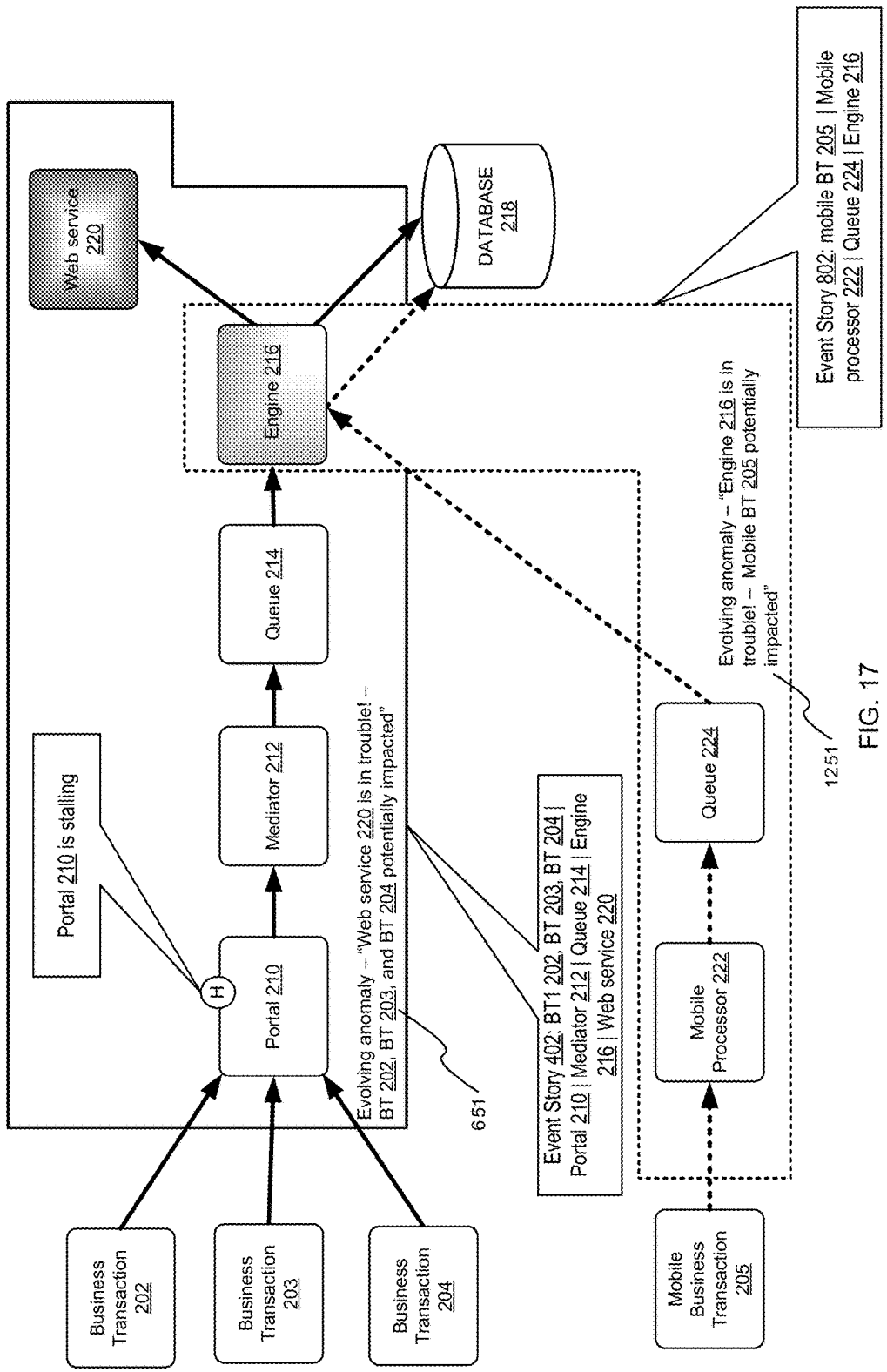
FIG. 17 depicts the dependency topology of FIG. 16 after detection of an eighth event, according to some embodiments.

FIG. 17 depicts the dependency topology of FIG. 16 after detection of an eighth event, according to some embodiments. An eighth event H is detected in the portal 210. The eighth event H is triggered in response to the portal 210 stalling. With reference to the example depicted in FIG. 1, an agent executing in the portal 210 can trigger the event. The event manager 120 can detect and log the event in the database 118.

Figure 18:
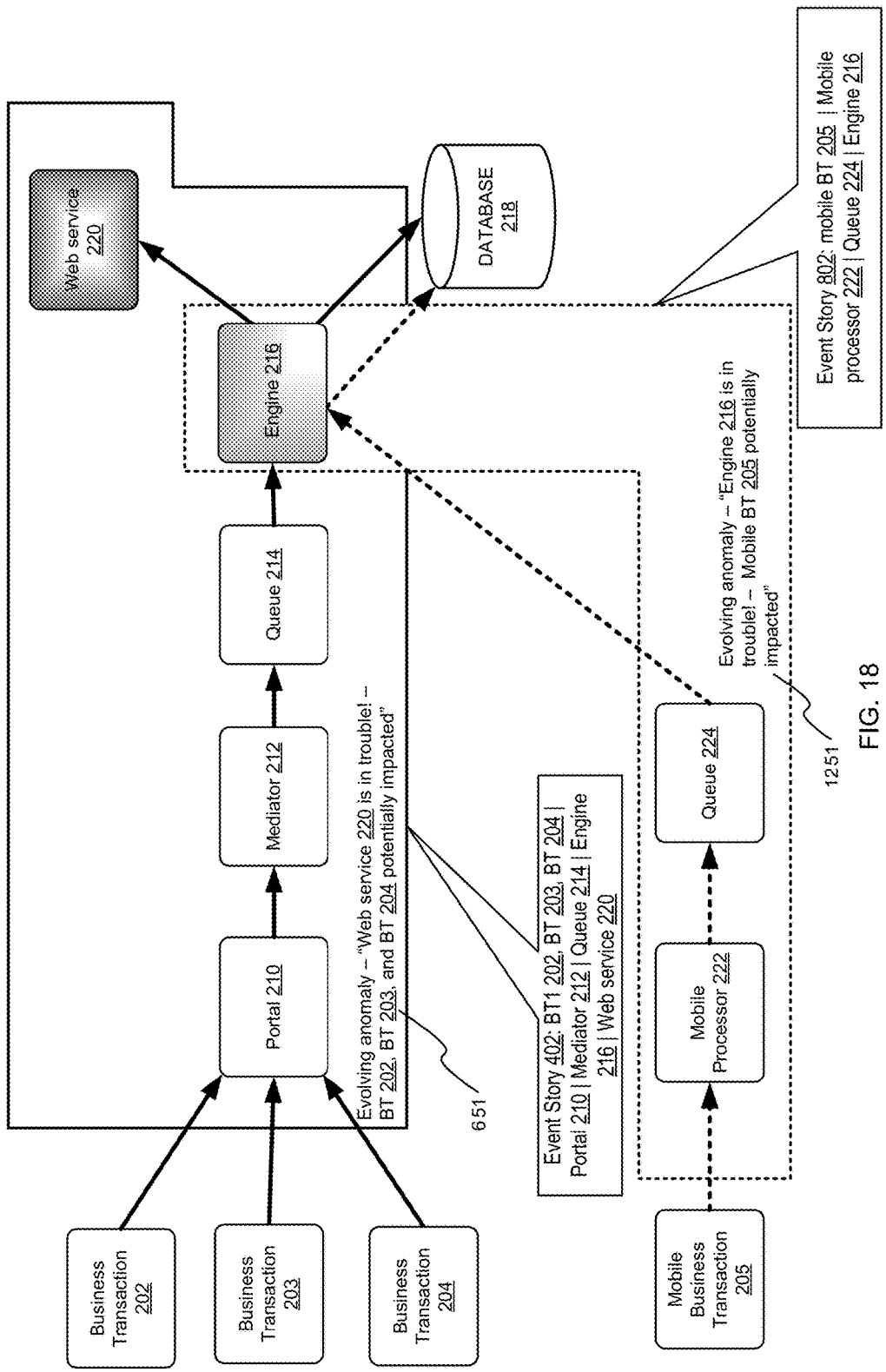
FIG. 18 depicts the dependency topology of FIG. 17 that includes the evolving event story in response to the eighth event, according to some embodiments.

FIG. 18 depicts the dependency topology of FIG. 17 that includes the evolving event story in response to the eighth event, according to some embodiments. In response to the eighth event H at the portal 210, both the event story 402 and the event story 802 again remain unchanged. For the event story 402, no additional components are affected or potentially affected. Also, the application components that are the most likely root cause of the events for each subgroup remains unchanged. In this case, the web service 220 is still the deepest application component in the dependency chain directly affected by the events for the event story 402. For the event story 802, the portal 210 is not in the second subgroup. Thus, this event at the portal 210 has no effect on application components in the second subgroup. No new written description is added for either story in response to the eighth event H.

Figure 19:
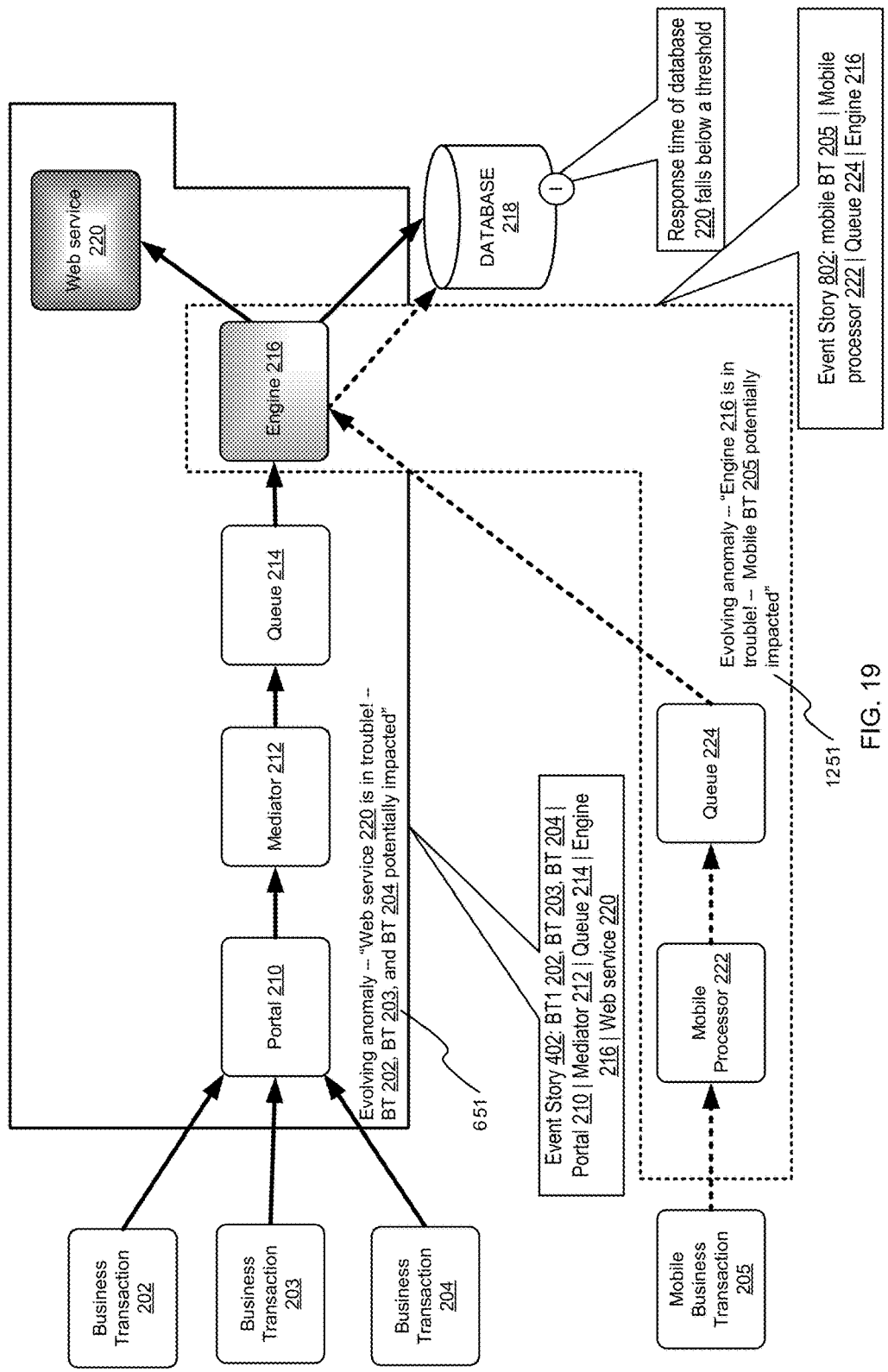
FIG. 19 depicts the dependency topology of FIG. 18 after detection of a ninth event, according to some embodiments.

FIG. 19 depicts the dependency topology of FIG. 18 after detection of a ninth event, according to some embodiments. A ninth event I is detected in the database 218. The ninth event I is triggered in response to the response time of the database 218 falling below a threshold. This response time can be for read and write accesses, only read accesses, only write accesses, etc. With reference to the example depicted in FIG. 1, an agent executing in the database 218 or the engine 216 can trigger the event. The event manager 120 can detect and log the event in the database 118.

Figure 20:
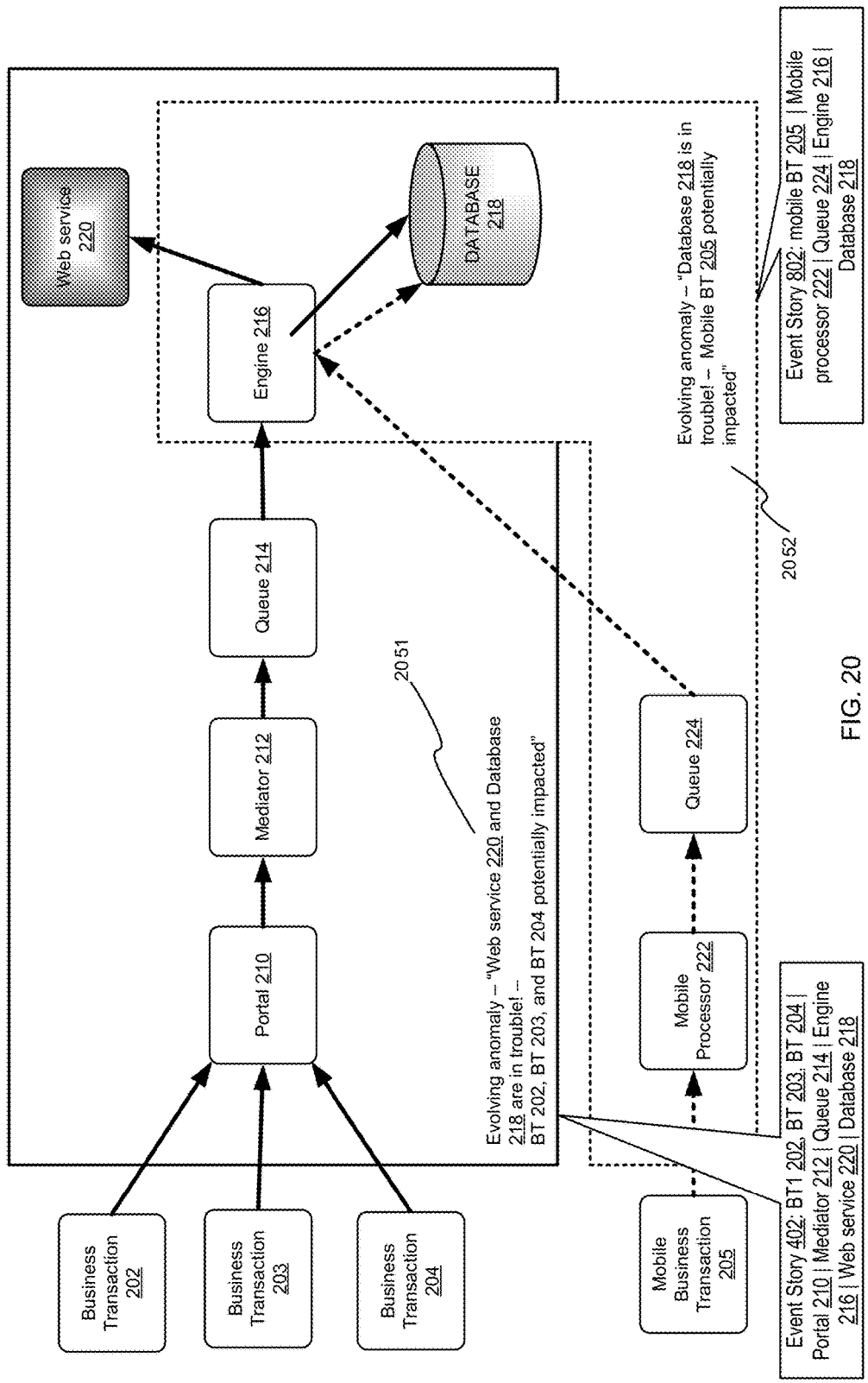
FIG. 20 depicts the dependency topology of FIG. 19 that includes the evolving event story in response to the ninth event, according to some embodiments.

FIG. 20 depicts the dependency topology of FIG. 19 that includes the evolving event story in response to the ninth event, according to some embodiments. In response to the ninth event I at the database 218, both the event story 402 and the event story 802 evolve. The event story 402 is expanded to include the database 218. In this instance, the application components in the event story 402 now include the business transaction (BT) 202, the business transaction (BT) 203, the business transaction (BT) 204, the portal 210, the mediator 212, the queue 214, the engine 216, the web service 220, and the database 218.

A written description 2051 is added to the event story 402. The written description 2051 describes affects/potential affects from the ninth event I. In this example, the written description 2051 details an updated "Evolving Anomaly". The evolving anomaly details the specific application components directly affected and any business transactions that are potentially affected (thereby affecting end users that are creating the business transactions):

"Web service 220 and database 218 are in trouble! BT 202, BT 203, and BT 204 potentially impacted."

In addition to being recorded in the event story 402, the written description 2051 can be output for display to administrators or other persons. For example, with reference to FIG. 1, the event manager 120 can output the written description 651 to be displayed on the user interface 122.

The event story 802 is also expanded to include the database 218. In this instance, the application components in the event story 802 now include the mobile business transaction (BT) 205, the mobile processor 222, the queue 224, the engine 216, the web service 220, and the database 218.

A written description 2052 is added to the event story 802. The written description 2052 describes affects/potential affects from the ninth event I. In this example, the written description 2052 details an updated "Evolving Anomaly". The evolving anomaly details the specific application components directly affected and any business transactions that are potentially affected (thereby affecting end users that are creating the business transactions):

"Database 218 is in trouble! Mobile BT 205 potentially impacted."

In addition to being recorded in the event story 802, the written description 2052 can be output for display to administrators or other persons. For example, with reference to FIG. 1, the event manager 120 can output the written description 651 to be displayed on the user interface 122. Also, the application component that is most likely the root cause of the event(s) for each of the two subgroup is highlighted. As described above, the application component where an event occurred and is the deepest in the dependency chain is considered the most likely root cause.

For the first subgroup, the application components where an event occurred include the portal 210, the engine 216, the web service 220, and the database 218. In this instance, the web service 220 and the database 218 can both be considered the root cause of the events for the first subgroup because both are at a same deepness in the dependency chain. The web service 220 and the database 218 are highlighted. Therefore, both the web service 220 and the database 218 can be accessed and determined if any correction is needed. Alternatively, either application component can be accessed prior to accessing the other. For example, the database 218 can be accessed first because this component is also affecting the second subgroup (see below).

For the second subgroup, the application components where an event occurred include the mobile processor 222, the engine 216, and the database 218. The database 218 would be considered the deepest in the dependency chain for this second subgroup. The database 218 is highlighted.

Based on the assessment of the first subgroup, the database 218 is already being accessed as the root cause of events.

Example Operations

Figure 21:
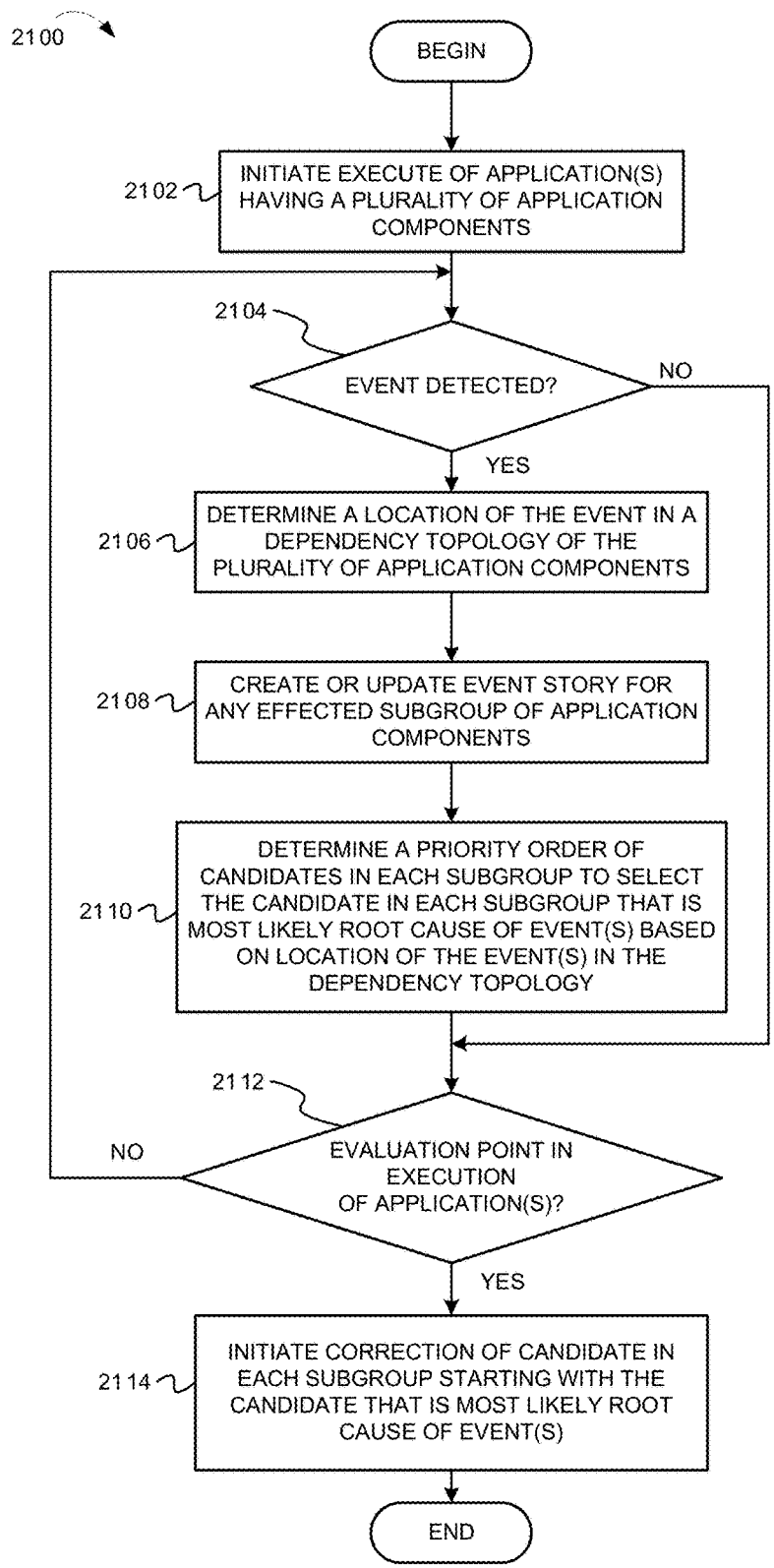
FIG. 21 depicts a flowchart of event tracking relative to a dependency topology of application components of application(s), according to some embodiments.

FIG. 21 depicts a flowchart of event tracking relative to a dependency topology of application components of application(s), according to some embodiments. A flowchart 2100 is described with reference to FIGS. 1-20. Operations of the flowchart 2100 can be performed by software, firmware, hardware or a combination thereof. For example, at least some of the operations can be performed by the event manager 120 depicted in FIG. 1. The operations of the flowchart 2100 start at 2102.

Execution of the application(s) is initiated (2102). There can be one or more applications executing. Each application can have one or more application components that can be located at a same or different devices. For example, some application components can be executing in client devices, while other application components are executing in back-end servers that are communicatively coupled to the client devices. The initiation of execution can occur after the probes have been installed in the different application components (as described above in reference to FIG. 1).

A determination is made of whether an event is detected (2104). With reference to FIG. 1, the event manager 120 can make this determination. The agents within the application components can trigger events when certain results occur (e.g., thresholds exceeded for response time, stalls, etc.). The event manger 120 can detect these events. If no event is detected, operations of continue at 2112. If an event is detected, operations continue at 2106.

A location of the event in the dependency topology of the plurality of application components is determined (2106). With reference to FIG. 1, the event manager 120 can determine the location. The event manager 120 can make this determination based on which agent communicated the event and a location of that agent (see description of FIG. 1 above regarding agents). For example, agents can be embedded or associated with each of the application components. With reference to FIG. 3, the first event A is located at the portal 210 between the business transactions 202-204 and the mediator 212. In this instance, an agent of the portal 210 communicated the event to the event manager 120. Based on an identification of the agent, the event manager 120 can determine the associated application component. The event manager 120 can then determine a location of the application component within the dependency topology based on an identification of the application component.

An event story is created or updated for any affected subgroups of application components (2108). With reference to FIG. 1, the event manager 120 can create and update an event story for any affected subgroups. Based on the dependency topology, the event manager 120 determines which subgroups include the application components that are affected. For instance, one application component (e.g., the engine 216) can be in two different subgroups. If an event story has not been created for a subgroup, the event manager 120 can create an event story data structure. To differentiate between event story data structures, the event story data structures can include an identification of the subgroup. Thus, if there are no current event story data structures having an identification of a given subgroup, the event manager 120 creates an event story data structure. Alternatively, if the event manager 120 determines that an event story data structure exists for the current subgroup that is affected, the event manager 120 can update the existing event story data structure for the affected subgroup. To help illustrate with reference to FIGS. 7-8, the third event C is detected. As described above, the example depicted in FIGS. 2-20 include two subgroups. In response to the third event C at the engine 216, the event story 402 for the first subgroup can be updated to indicate that an event occurred at the engine 216. Also in response to the third event C, the event story 802 for the second subgroup is created. The event story 802 is created because the engine 216 is the first application in the second subgroup that is affected or potentially affected during execution of the application(s).

A priority order of candidate components in each subgroup is determined to select the candidate component in each subgroup that is the most likely root cause of event(s) based on location of the events in the dependency topology (2110). With reference to FIG. 1, the event manager 120 can make this determination. With reference to FIG. 20, the application components where an event occurred include the mobile processor 222, the engine 216, and the database 218. A priority order to these application components is determined. As described above, the priority order can be based on which of these application components is deepest in the dependency chain for this subgroup. In this example and starting with the deepest application component, the priority order includes the database 218, the engine 216, and the mobile processor 222.

A determination is made of whether an evaluation point in execution of the application(s) has been reached (2112). With reference to FIG. 1, the event manager 120 can make this determination. As described above, an evaluation point can occur at different points of execution of the application. An evaluation point can be after the application has completed execution. In another instance, an evaluation point can be after a request (e.g., a business transaction) is made and a response provided. In situations where execution of application components is stalling, an evaluation point can be after a timeout (e.g., after no response to a business transaction or other request). These evaluation points can be embedded in the software code as breaks. For example, when a break is encountered in the software code, a message can be displayed and a request for entering a value to continue execution of the application. For instance, a message can be displayed that a response to business transaction V has completed and request for the user to input a value if they want execution of the application to continue. If an evaluation point has not been reached, operations return to 2104. If an evaluation point has been reached, operations continue at 2114.

Using the priority order of candidate components (see 2110 above), correction of the candidate components in each subgroup is initiated (2114). Correction begins with the candidate component that is the most likely root cause of events. With reference to FIG. 1, the event manager 120 can initiate correction. In some embodiments, initiation can include notification to developers or programmers for the application component candidate. Returning to the example of FIG. 20, the developers or programmers of the database 218 can be notified that the database 218 is a root cause of events occurring during execution of the application(s). The notification can include the data recorded in the event stories and any other relevant data. After the database 218 is assessed and any corrections are made and if any events remain during re-execution of the application(s), the developers or programmers of the next most likely root cause of events (the engine 216) are notified. The next most likely root cause is based on the priority order of the candidate components (see 2110 above). In particular, the priority order provides an order from most to least likely root cause of the events for a subgroup. After the database 218 is assessed and any corrections are made and if any events remain during re-execution of the application(s), the developers or programmers of the next most likely root cause of events (the mobile processor 222) are notified. Thus, operations of the flowchart 2100 can be restarted after any assessment and correction is made to again determine if the application(s) is executing without any events.

Example Computer Device

Figure 22:
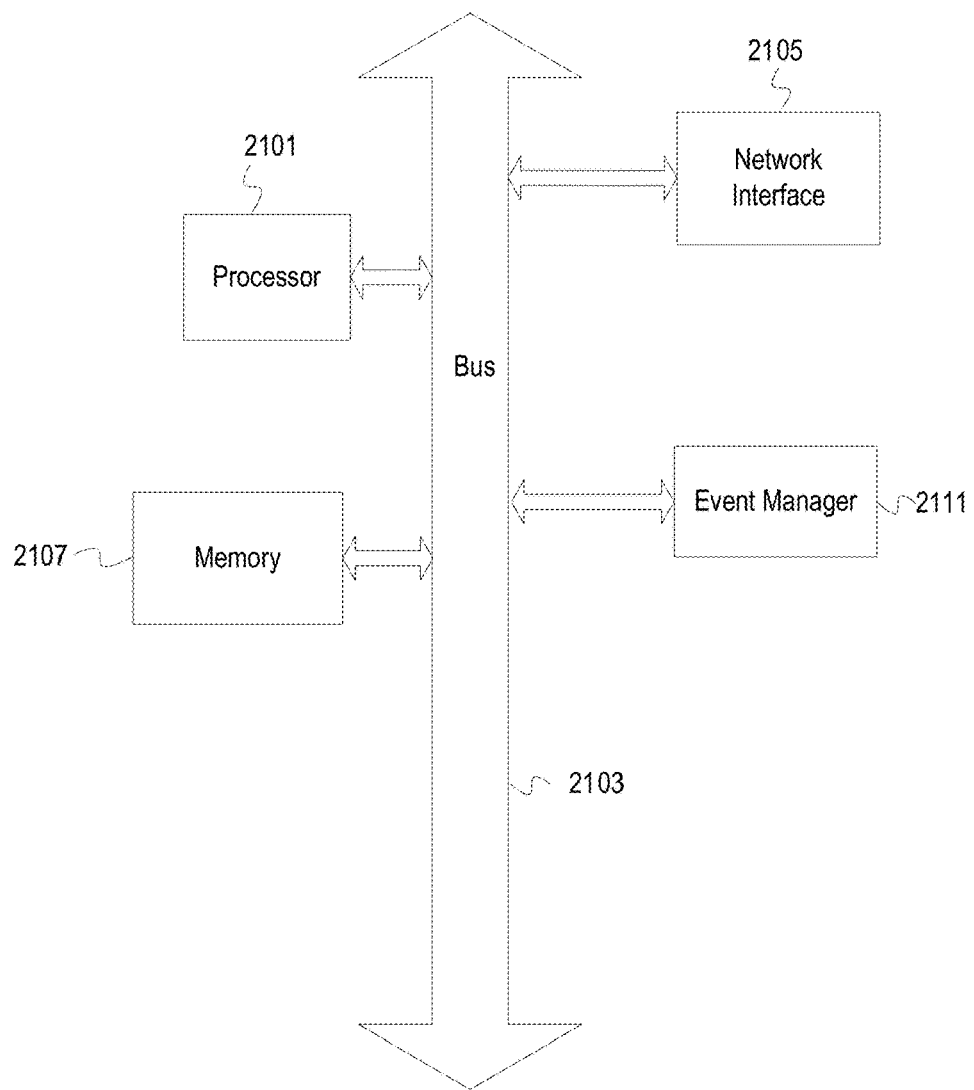
FIG. 22 depicts an example computer device, according to some embodiments.

FIG. 22 depicts an example computer device, according to some embodiments. The computer device includes a processor 2201 (possibly including multiple processors, multiple cores, multiple nodes, and/or implementing multithreading, etc.). The computer device includes memory 2207. The memory 2207 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer device also includes a persistent data storage 2209. The persistent data storage 2209 can be a hard disk drive, such as magnetic storage device. The computer device also includes a bus 2203 (e.g., PCI, ISA, PCI-Express, HyperTransport® bus, InfiniBand® bus, NuBus, etc.) and a network interface 2205 (e.g., a Fiber Channel interface, an Ethernet interface, an internet small computer system interface, SONET interface, wireless interface, etc.).

The computer device also includes an event manager 2211. The event manager 2211 can perform operations to track events during execution of application(s) and to create a prioritized order of application components to determine the application component that is the most likely root cause of the events, as described above. Any one of the previously described functionalities may be partially (or entirely) implemented in hardware and/or on the processor 2201. For example, the functionality may be implemented with an application specific integrated circuit, in logic implemented in the processor 2201, in a co-processor on a peripheral device or card, etc. Further, realizations may include fewer or additional components not illustrated in FIG. 22 (e.g., video cards, audio cards, additional network interfaces, peripheral devices, etc.). The processor 2201, the network interface 2205, and the persistent data storage 2209 are coupled to the bus 2203. Although illustrated as being coupled to the bus 2203, the memory 2207 may be coupled to the processor 2201.

Variations

The examples often refer to a "manager." The manager is a construct used to refer to implementation of functionality for monitoring events and create a prioritized order of application components for correction based on location of the events within a dependency topology. This construct is utilized since numerous implementations are possible. A manager may be a particular component or components of a machine (e.g., a particular circuit card enclosed in a housing with other circuit cards/boards), machine-executable program or programs, firmware, a circuit card with circuitry configured and programmed with firmware for performing the operations described herein, etc. The term is used to efficiently explain content of the disclosure. Although the examples refer to operations being performed by a manager, different entities can perform different operations. For instance, a dedicated co-processor or application specific integrated circuit can receive the events, while a manager creates a prioritized order of application components for correction based on location of the events within a dependency topology.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, detection of multiple events can overlap or occur in parallel in block 2104 of FIG. 21. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for tracking events and creating a prioritized order of application components for correction based on location of the events within a dependency topology as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    detecting a first event during execution of an application that comprises a plurality of application components;
    determining that the first event occurred in a first application component of the plurality of application components, wherein the first application component is within a first subgroup of the plurality of application components, and wherein a first dependency chain exists among application components in the first subgroup;
    detecting a second event during execution of the application;
    determining that the second event occurred in a second application component of the plurality of application components, wherein the second application component is within the first subgroup;
    determining, for the first subgroup, a first priority order among the first application component and the second application component based, at least in part, on locations of the first application component and the second application component in the first dependency chain; and
    selecting from the first and the second application components based on the first priority order to identify within the first subgroup a most likely root cause of the first event and the second event.

2. The method of claim 1, further comprising:
    initiating correction of the selected application component to remove the most likely root cause of the first event and the second event.

3. The method of claim 1, further comprising:
    detecting a third event during execution of the application;
    determining that the third event occurred in a third application component of the plurality of application components, wherein the first application component and the third application component are within a second subgroup of the plurality of application components, wherein a second dependency chain exists among application components in the second subgroup, wherein the second application component is not within the second subgroup;
    determining, for the second subgroup, a second priority order among the first application component and the third application component, wherein the second priority order is based, at least in part, on locations of the first application component and the third application component in the second dependency chain; and
    selecting from the first and the third application components based, at least in part on the second priority order to identify within the second subgroup a most likely root cause of the first event and the third event.

4. The method of claim 3, further comprising:
    initiating correction of the selected application component of the second subgroup to remove the most likely root cause of the first event and the third event.

5. The method of claim 3, wherein selecting from the first and the third application components depends upon selecting from the first and the second application components.

6. The method of claim 1, further comprising:
    performing the following, until an evaluation point is reached during execution of the application,
        detecting an additional event;
        determining that the additional event occurred in an additional application component within the first subgroup;
        determining, for the first subgroup, an updated priority order among the first application component, the second application component, and the additional application component, wherein the updated priority order is based, at least in part, on locations of the first application component, the second application component, and the additional application component in the first dependency chain; and
        selecting a different candidate having a greatest priority in the updated priority order for application components in the first subgroup, wherein the different candidate comprises an application component among the first subgroup that is a most likely root cause of the first event, the second event, and the additional event.

7. The method of claim 6, further comprising:
initiating correction of the different candidate to remove the most likely root cause of the first event, the second event, and the additional event.

8. The method of claim 1, wherein each of the first event and the second event comprise at least one of a degradation in performance and a stall in execution of at least one of the plurality of application components.

9. The method of claim 1, wherein selecting from the first and second application components comprises selecting from the first and second application components that is the deepest in the first dependency chain.

10. The method of claim 1, wherein the first priority order includes application components where events occurred during execution of the application.

11. The method of claim 1, wherein the first subgroup includes other applications components within the first dependency chain, wherein the other application components are not within the first priority order in response to an event not occurring at the other application components.

12. An apparatus comprising:
a processor; and
a machine-readable medium having program code executable by the processor to cause the apparatus to:
initiate execution of an application comprising a plurality of application components;
detect a first event during execution of the application;
determine that the first event occurred in a first application component of the plurality of application components, wherein the first application component is within a first subgroup of the plurality of application components, and wherein a first dependency chain exists among application components in the first subgroup;
detect a second event during execution of the application;
determine that the second event occurred in a second application component of the plurality of application components, wherein the second application component is within the first subgroup;
determine, for the first subgroup, a first priority order among the first application component and the second application component, wherein the first priority order is based, at least in part, on locations of the first application component and the second application component in the first dependency chain; and
select a candidate having a greatest priority in the first priority order for application components in the first subgroup, wherein the candidate for the first subgroup comprises an application component among the first subgroup that is a most likely root cause of the first event and the second event.

13. The apparatus of claim 12, wherein the program code comprises program code executable by the processor to cause the apparatus to:
initiate correction of the candidate having the greatest priority in the first priority order to remove the most likely root cause of the first event and the second event.

14. The apparatus of claim 12, wherein the program code comprises program code executable by the processor to cause the apparatus to:
detect a third event during execution of the application;
determine that the third event occurred in a third application component of the plurality of application components, wherein the first application component and the third application component are within a second subgroup of the plurality of application components,
wherein a second dependency chain exists among application components in the second subgroup, wherein the second application component is not within the second subgroup;
determine, for the second subgroup, a second priority order among the first application component and the third application component, wherein the second priority order is based, at least in part, on locations of the first application component and the third application component in the second dependency chain; and
select a candidate having a greatest priority in the second priority order for application components in the second subgroup, wherein the candidate for the second subgroup comprises an application component among the second subgroup that is a most likely root cause of the first event and the third event.

15. The apparatus of claim 14, wherein the program code comprises program code executable by the processor to cause the apparatus to:
initiate correction of the candidate having the greatest priority in the second priority order to remove the most likely root cause of the first event and the third event.

16. The apparatus of claim 14, wherein the candidate for the first subgroup is different than the candidate for the second subgroup.

17. The apparatus of claim 12, wherein the program code comprises program code executable by the processor to cause the apparatus to:
perform the following, until an evaluation point is reached during execution of the application,
detect an additional event;
determine that the additional event occurred in an additional application component within the first subgroup;
determine, for the first subgroup, an updated priority order among the first application component, the second application component, and the additional application component, wherein the updated priority order is based, at least in part, on locations of the first application component, the second application component, and the additional application component in the first dependency chain; and
select a different candidate having a greatest priority in the updated priority order for application components in the first subgroup, wherein the different candidate comprises an application component among the first subgroup that is a most likely root cause of the first event, the second event, and the additional event.

18. The apparatus of claim 17, wherein the program code comprises program code executable by the processor to cause the apparatus to:
initiate correction of the different candidate to remove the most likely root cause of the first event, the second event, and the additional event.

19. One or more machine-readable storage media comprising program code for prioritizing application components for root cause analysis, the program code to:
for each event detected during execution of a monitored application comprising a plurality of application components,
determine which of the plurality of application components corresponds to the detected event;
identify a dependency subgroup that includes the application component that corresponds to the detected event, wherein a dependency subgroup indicates dependencies among a subgroup of the plurality of application components;

determine location within the dependency subgroup of the application component corresponding to the detected event;

determine an order of correction for the application components determined to correspond to detected events based, at least in part, on the determined location; and initiate correction of the application components determined to correspond to detected events according to the determined order of correction.

20. The one or more machine-readable storage media of claim 19, wherein each event comprises at least one of a degradation in performance and a stall in execution of at least one of the plurality of application components.

* * * * *